United States Patent
Rao et al.

(10) Patent No.: US 12,490,291 B2
(45) Date of Patent: Dec. 2, 2025

(54) METHODS, ARCHITECTURES, APPARATUSES AND SYSTEMS FOR EXTENDED REALITY-ASSISTED RADIO RESOURCE MANAGEMENT

(71) Applicant: InterDigital Patent Holdings, Inc., Wilmington, DE (US)

(72) Inventors: Jaya Rao, Montreal (CA); Yugeswar Deenoo Narayanan Thangaraj, Chalfont, PA (US); Ghyslain Pelletier, Montreal (CA); Dylan Watts, Montreal (CA); Navjot Kaur, Brampton (CA); Benoit Pelletier, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 392 days.

(21) Appl. No.: 18/013,098

(22) PCT Filed: Jul. 1, 2021

(86) PCT No.: PCT/US2021/040110
§ 371 (c)(1),
(2) Date: Dec. 27, 2022

(87) PCT Pub. No.: WO2022/006410
PCT Pub. Date: Jan. 6, 2022

(65) Prior Publication Data
US 2023/0337269 A1    Oct. 19, 2023

Related U.S. Application Data

(60) Provisional application No. 63/190,901, filed on May 20, 2021, provisional application No. 63/047,304, filed on Jul. 2, 2020.

(51) Int. Cl.
 H04W 24/10    (2009.01)
 H04B 7/06     (2006.01)
 H04W 72/542   (2023.01)

(52) U.S. Cl.
 CPC ...... H04W 72/542 (2023.01); H04B 7/06952 (2023.05); H04W 24/10 (2013.01)

(58) Field of Classification Search
 CPC .............. H04W 72/542; H04W 24/10; H04W 36/0083; H04W 72/04; H04B 7/088; H04B 7/0695; H04B 7/08; H04B 7/06
 See application file for complete search history.

(56) References Cited

U.S. PATENT DOCUMENTS

| | | | |
|---|---|---|---|
| 2019/0319686 A1 | 10/2019 | Chen et al. | |
| 2020/0259545 A1* | 8/2020 | Bai | H04B 7/063 |
| 2022/0148445 A1* | 5/2022 | Bauer | B64C 39/024 |

FOREIGN PATENT DOCUMENTS

WO    WO 2019160973 A1    8/2019

OTHER PUBLICATIONS

Anonymous, "Technical Specification Group Services and System Aspects; Extended Reality (XR) in 5G", 3rd Generation Partnership Project (3GPP), Release 16, Document: 3GPP TR 26.928 V16.0.0, Mar. 2020; 131 pages.

(Continued)

Primary Examiner — Chuong A Ngo
(74) Attorney, Agent, or Firm — Volpe Koenig

(57) ABSTRACT

Extended Reality (XR) applications may require high throughput and very low latency. New Radio (NR) Wireless receiver/transmitter units (WTRUs) running XR applications (XR-WTRUs) may be confronted with link failures when these applications are used in dense urban or indoor environments because of these devices operating in the millimeter band. Methods and devices are provided therefore for performing cell selection and beam management (Continued)

proactively to avoid link failure due to objects being in line of sight between the XR-WTRU and a network node with which it has established a connection. XR-WTRUs may therefore perform visual sensing that may enable visualizing current and future radio environment and using this information to prevent link failures by handing the XR-WTRU over to an alternative network node in line of sight of the XR-WTRU before the XR-WTRU is no longer in line of sight of the network node with which it has established a connection.

13 Claims, 10 Drawing Sheets

(56) References Cited

OTHER PUBLICATIONS

Anonymous, "Basic HO Considering the FFS Issues," 3rd Generation Partnership Project (3GPP), Document: R2-1802407, Athens, Greece, Feb. 26, 2018, 5 pages.

Anonymous, "Technical Specification Group Radio Access Network; NR; NR and NG-RAN Overall Description", 3rd Generation Partnership Project (3GPP), Stage 2 (Release 16), Document: 3GPP TS 38.300 V16.1.0, Mar. 2020; 133 pages.

* cited by examiner

# METHODS, ARCHITECTURES, APPARATUSES AND SYSTEMS FOR EXTENDED REALITY-ASSISTED RADIO RESOURCE MANAGEMENT

CROSS REFERENCE TO RELATED APPLICATIONS

This application is a U.S. National Stage Application under 35 U.S.C. 371 of International Patent Application No. PCT/US2021/040110, filed Jul. 1, 2021, which is incorporated herein by reference in its entirety.

This application claims the benefit of U.S. Provisional Patent Application Nos. 63/047,304, filed Jul. 2, 2020, and 63/190,901, filed May 20, 2021, each of which is incorporated herein by reference.

BACKGROUND

The present disclosure is generally directed to the fields of communications, software and encoding, including, for example, to methods, architectures, apparatuses, systems directed to extended reality-assisted radio resource management.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals in the figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
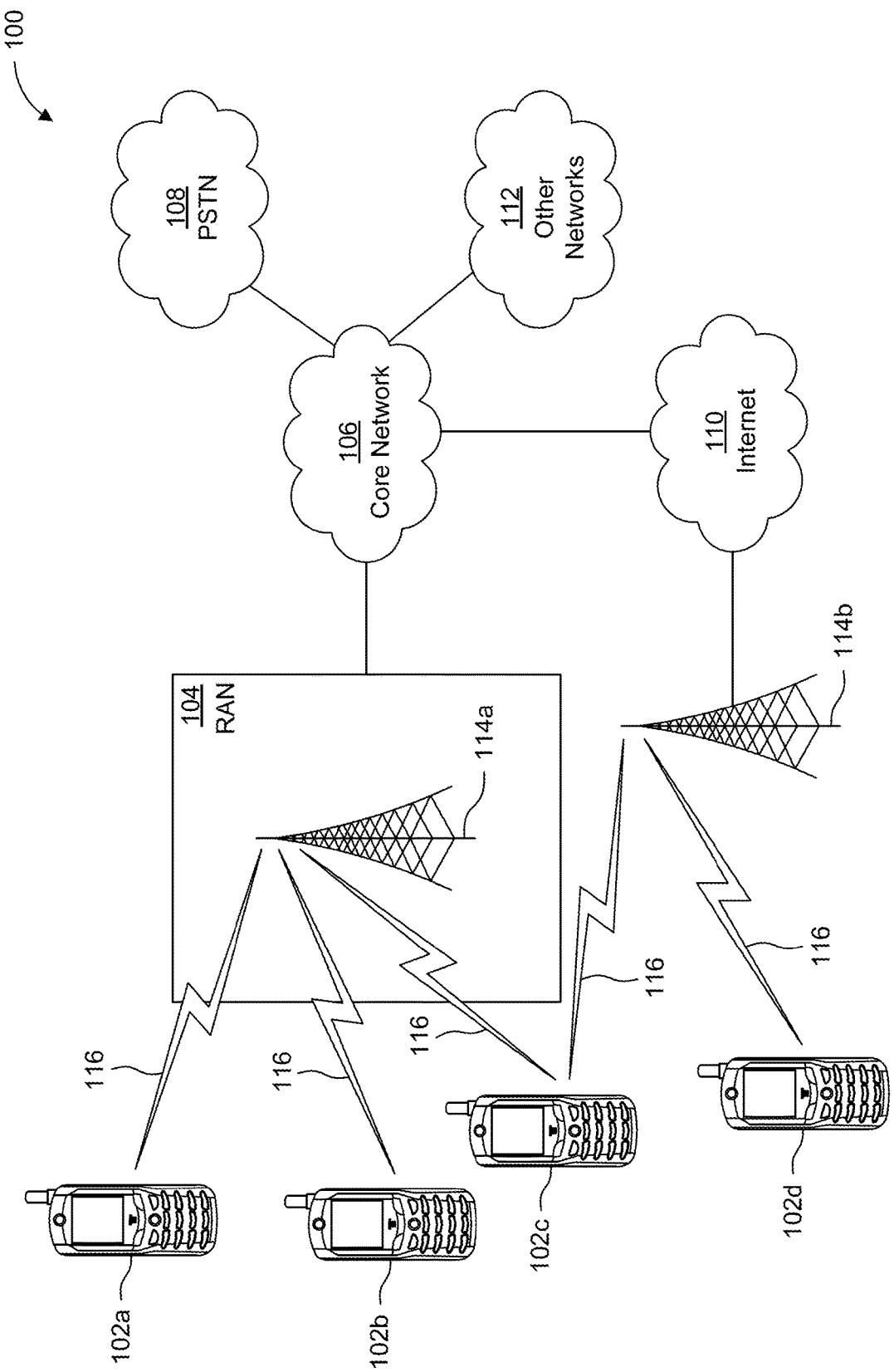
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
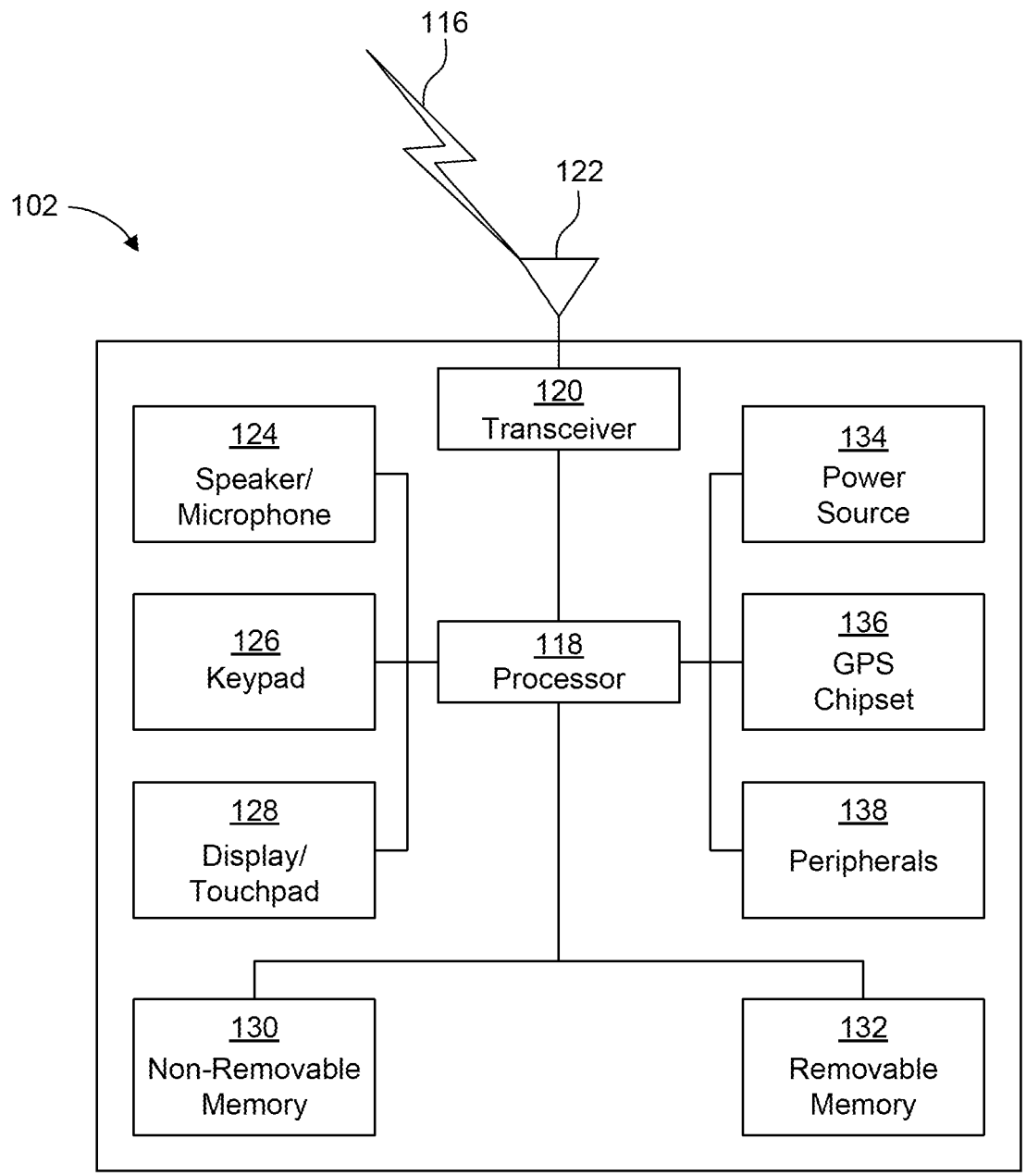
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
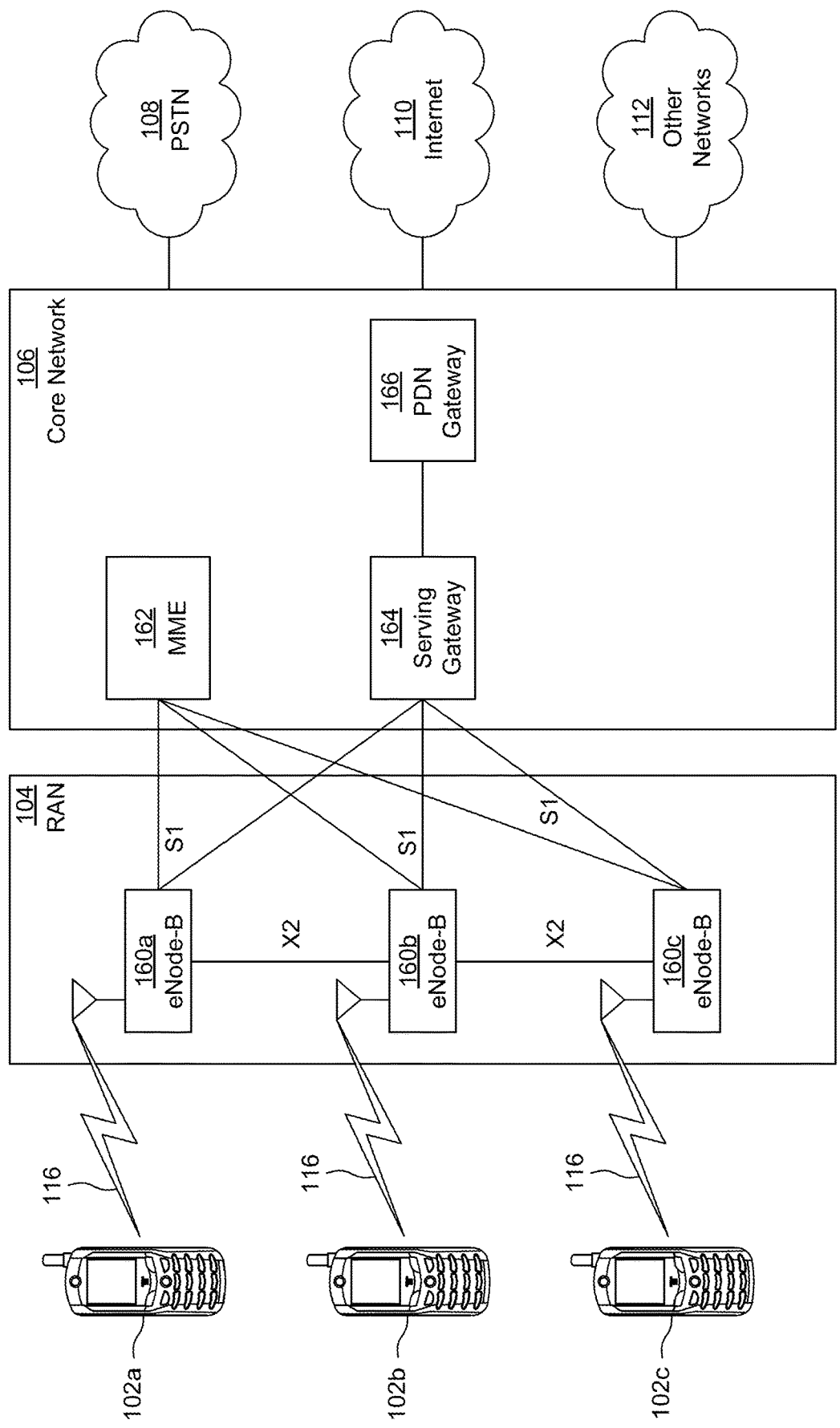
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
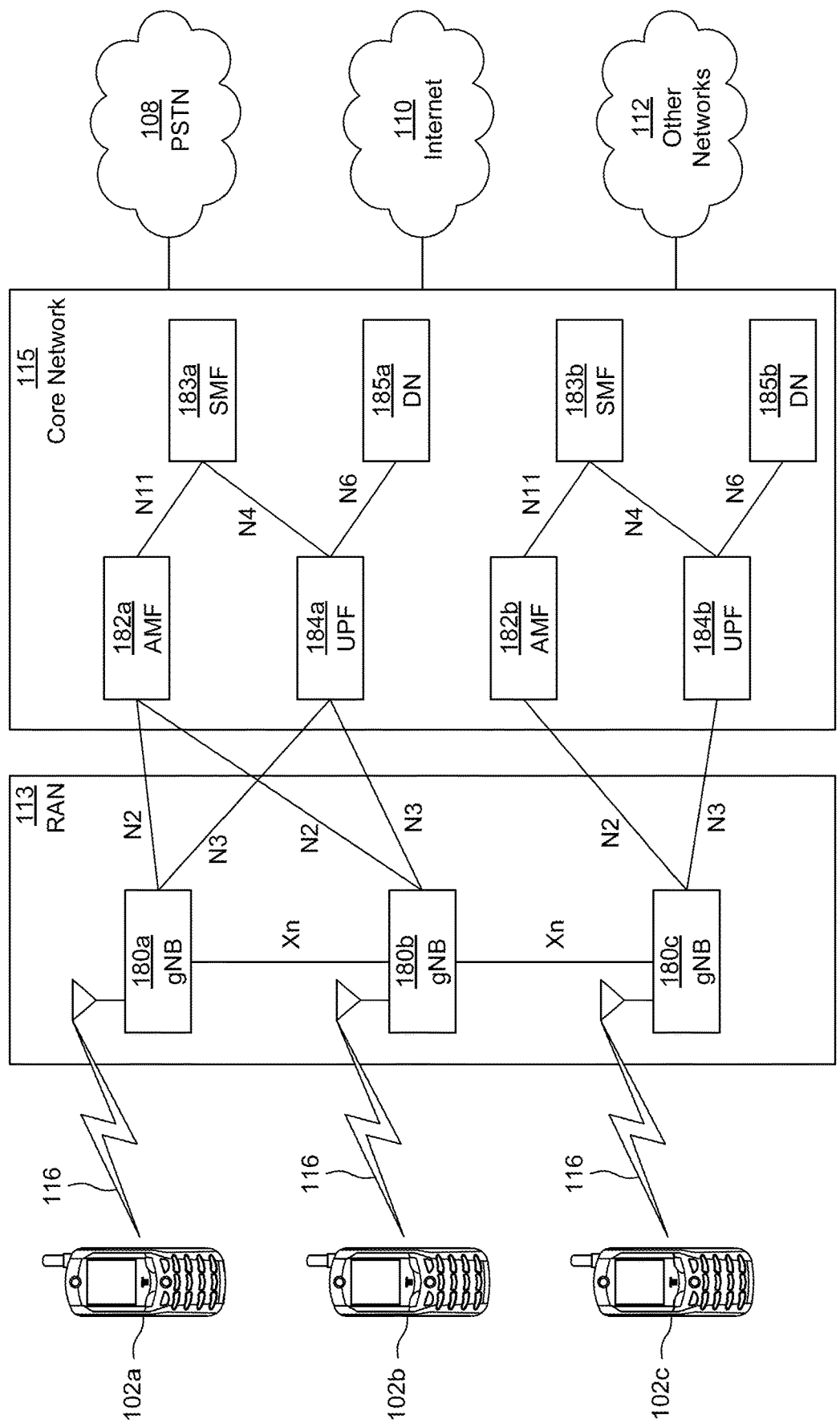
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

The term eXtended Reality (XR) is an umbrella term for different types of realities including Virtual Reality (VR), Augmented Reality (AR) and Mixed Reality (MR) and the realities interpolated among them. Virtual Reality (VR) is a rendered version of a delivered visual and audio scene. The rendering is designed to mimic the visual (e.g. stereoscopic 3D) and audio sensory stimuli of the real world as naturally as possible to an observer or user as they move within the limits defined by the application. Augmented Reality (AR) is when a user is provided with additional information or artificially generated items or content overlaid upon their current environment. Mixed Reality (MR) is an advanced form of AR where some virtual elements are inserted into the physical scene with the intent to provide the illusion that these elements are part of the real scene. XR may include to all real-and-virtual combined environments and human-machine interactions generated by computer technology and wearables.

The notion of immersion in the context of XR services refers to the sense of being surrounded by the virtual environment as well as providing the feeling of being physically and spatially located in the virtual environment. The levels of virtuality may range from partial sensory inputs to fully immersive multi-sensory inputs leading to a virtual reality practically indiscernible from actual reality.

XR devices may be typically associated with capabilities that offer various degrees of spatial tracking. XR devices may be equipped with various sensors to enable spatial tracking, for e.g. monocular/stereo/depth cameras, radio beacons, Global Positioning System (GPS), inertial sensors etc. Possibly such spatial tracking may be performed at different levels, e.g. 3 Degrees of Freedom—DoF (i.e. rotational motion along X, Y and Z axis), 6 DoF (i.e. rotational and/or translational motion along X, Y and Z axis). Possibly such spatial tracking may result in an interaction to experience some form of virtual content. The user may act in and/or interact with the components within extended reality. For example, the actions and/or interactions may involve movements, gestures, eye tracking etc. Spatial tracking is an important enabler for immersive XR experience. For example, some form of head and/or motion tracking may ensure that the simulated visual and audio components from the user perspective are updated to be consistent with user's movements. Imprecise and/or delayed spatial tracking may lead to sensation of discomfort and/or motion sickness for the user.

XR devices may come in variety of form factors. Typical XR devices may include, but not limited to the following: Head Mounted Displays (HMD), optical see-through glasses and camera see-through HMDs for AR and MR, mobile devices with positional tracking and camera, wearables etc. In addition to the above, several different types of XR devices may be envisioned based on XR device functions for e.g. as display, camera, sensors, sensor processing, wireless connectivity, XR/Media processing, power supply etc. to be provided by one or more devices, wearables, actuators, controllers and/or accessories.

Supporting XR related applications may require high throughput and ultra-low latency for overlaying dynamic 3D models over the user's field of view in real-time. It may therefore be necessary to maintain highly reliable directional links between a Wireless Transmit/Receive Unit (WTRU) and network at all times. However, the existing Radio Resource Management (RRM) framework in New Radio (NR) for performing cell selection and beam management reactively based on Radio Frequency (RF) measurement triggers may not be adequate to prevent potential link failures or link blockages, especially in dense urban scenarios or in high density indoor setting.

Overview

A WTRU supporting XR services may be equipped with plurality of image sensors (e.g. front facing cameras, 360 degrees camera) to enable inside out tracking. The image sensor feed, consisting of one or more image frames, combined with image processing may provide a capability to perform visual sensing; that is, determining relevant information from the environment as observed by the camera(s) from the camera images. A WTRU supporting XR services may also be equipped with capability to display a stereoscopic 3D video. Additionally, the WTRU may also have a capability of overlaying visual information on top of the video feed.

According to an embodiment, a combination of visual sensing and overlay capability may enable visualizing the current and future radio environment based on the processing and analysis of the real time visual information acquired from the camera. In this case, the visual information may be used to determine the relative positioning of the WTRU with respect to blockages and other connectivity options (e.g. alternative links, gNBs, relay nodes) to proactively identify alternative communication paths between the WTRU and the network nodes.

According to an embodiment, the visual information along with the RRM information related to the RF measurements and overall traffic load may be used to determine the potential performance achievable (e.g., QoS, Quality of Experience (QoE)), in the surroundings where the WTRU may be located and overlay the determined performance information in real-time in the user's field of view. However, to ensure proper overlaying the RRM information received from the RRM entity in the network may be synchronized with the positioning of the WTRU and direction of the WTRU viewpoint to prevent any spatial and timing misalignment at the WTRU.

In this regard, certain enhancements in the RRM framework may utilize the capabilities provided by XR-WTRU to improve robustness of link management and mobility management procedures and for overlaying the RRM information in the WTRU with appropriate spatial-temporal adjustments.

Methods described herein are exemplified based on transmissions and delivery of XR services. Those methods are not limited to such scenarios, systems and services and may be applicable to any type of transmissions and/or services, including but not limited to Cloud gaming, URLLC, IoT/MTC, industrial use cases, vehicle-to-everything (V2X), Multimedia Broadcast Multicast Services (MBMS). The terms XR, VR, AR and, MR may be used interchangeably. The terms XR device, WTRU and XR-WTRU may be used interchangeably.

In the following, the term 'viewport' is used when referring to the rectangular image frame captured by the XR-WTRU with an image sensor. The term 'field of view' or 'viewpoint' is typically used when referring to a user of the XR-WTRU.

Determining RRM Events Based on XR Sensing

Wtru is Configured to Detect XR-RRM Objects Based on XR Related Sensing

According to an embodiment, a WTRU may be configured by the network to perform measurement and sensing to detect XR-RRM measurement objects based on XR-RRM measurement events. The XR-RRM measurement objects and XR-RRM events may be configured based on the awareness of WTRU capability to perform XR related functions indicated to the network during Radio Resource Control (RRC) configuration, for example. The WTRU capability related to XR that may be indicated to the network may include the ability to perform positioning sensing using internal positioning sensors and ability to perform visual sensing using image sensors (e.g. front facing camera, 360 degrees camera) to capture image frames, for example. In some embodiments, the combination of visual sensing and position/rotational sensing and subsequent processing of the sensor data may enable the WTRU to perform fine granularity spatial tracking.

The XR-RRM events configured in the WTRU may be associated with one or more triggering conditions. Additionally, the WTRU may also be configured to record and/or report the XR-RRM measurement object when the triggering conditions associated with an XR-RRM event are satisfied. In this case, when performing measurement and/or sensing, the WTRU may monitor for the triggering of the configured XR-RRM event and record the XR-RRM measurement object when the XR-RRM event is triggered. For example, a WTRU may be configured with an XR-RRM event consisting of a geographic position/location (e.g., coordinates determined with GNSS) and an associated XR measurement object corresponding to the direction of the WTRU viewport, referring to direction of the front facing image sensor in WTRU which captures the 2D image plane on which 3D objects are projected. In this example, the WTRU may record and report to the network (e.g., to the serving gNB) the direction of the WTRU's viewport when reaching the configured position/location.

The different XR-RRM measurement objects may be associated with one or more measurement events configured in the WTRU and referenced with a configuration identifier and XR-RRM measurement object identifier/index. The types of XR-RRM events and XR measurement objects that may be configured in the WTRU may include one or more combination of positioning, vision and Quality of Experience (QoE) related events and measurement objects. The different types of the XR-RRM configurations events and measurement objects are described in the following subsections.

The WTRU may receive the XR-RRM configurations, that may consisting of the XR-events and the associated XR-RRM measurement objects, in an RRC configuration message and/or in DL data (e.g., from a core network function or an application function). In another example, the WTRU may receive the XR-RRM configurations from an alternative RRC entity, where the alternative RRC entity may use a Signaling Radio Bearer (SRB) or protocol stack configuration which may be different from the SRB/protocol stack configuration used for the (primary) RRC entity. The alternative RRC entity may be used for configuring the measurement events and objects related to visual sensing/measurements, for example. Additionally, the XR-RRM events and the XR measurement objects may be associated with a validity time (e.g., consisting of start and stop time) and/or validity position (e.g., consisting of a range of positions/locations relative to the WTRU). In this case, the measurement/sensing of the XR-RRM measurement objects with respect to the configured XR-RRM events may be triggered only when the validity time and/or position are applicable and valid.

The WTRU may also be configured to dynamically activate or deactivate one or more of the XR-RRM configurations based on an activation/deactivation indicator received from the network. For example, during configuration the WTRU may be configured with an initial state associated with the XR-RRM configuration, where the initial state may be set as either activated or deactivated. The WTRU may subsequently receive an indicator indicating the index associated with the XR-RRM configuration and/or the activation status of the XR-RRM configuration. The indicator for activating/deactivating the XR-RRM configuration may be received by the WTRU either in an RRC message, DL Medium Access Control Element (MAC CE), or DL data, for example. In this case, the WTRU may activate the XR-RRM configuration when receiving an activate indication by initiating to monitor the triggering of the XR related measurement/sensing with respect to the XR-RRM event. Likewise, the WTRU may suspend the XR-RRM configuration when receiving a deactivation indicator.

Examples of XR-RRM Events and Measurement Objects Related to Positioning Sensing The XR-RRM measurement objects related to positioning, which may be configured in the WTRU, may include one or more of the following:

Positioning information of WTRU: for example, the WTRU may be configured to determine the geographic location, direction of WTRU viewport, height of WTRU viewport and speed of WTRU using internal sensors (e.g. accelerometer, gyroscope, inertial sensor) or based on the measurements made on the positioning reference signals transmitted by the network;

Positioning information of other objects: for example, the WTRU may be configured to determine the positioning information of other spatial objects (e.g. vehicle) located proximate to the WTRU location. The WTRU may estimate the positioning information of the object relative to the position of the WTRU (e.g. distance from WTRU, direction angle with respect to WTRU viewport direction).

The positioning information may be determined by the WTRU using multiple Degrees of Freedom (DoF, for example 3 or 6 DoF) sensors may include the angles and ranges related to surge (x-axis), sway (y-axis), heave (z-axis), roll, pitch and yaw, for example. As an example, the XR-RRM events related to positioning configured in the WTRU may include change in the WTRU position by a certain threshold (e.g. change in DL-RSRP (Reference Signal Received Power) or change in WTRU viewport direction) and the associated measurement object to be recorded by the WTRU may be the current WTRU positioning information (e.g. current WTRU viewport direction).

The WTRU may also be configured to determine and report the positioning information proactively based on expected change of the WTRU positioning attributes when an XR-RRM event is triggered. The expected positioning attributes may be determined based on historical positioning information and prediction/forecasting techniques, for example. In this case, the WTRU may identify the timing information (e.g. via a timestamp) associated with the current and future positioning attributes when reporting the positioning attributes, for example.

Examples of XR-RRM Events and Measurement Objects Related to Visual Sensing

The XR-RRM measurement objects related to visual sensing, which may be configured in the WTRU, may include one or more of the following:

Images or visual objects/markers: for example, the WTRU may be configured with one or more images frames associated with a spatial object visible and detectable by the WTRU with image sensors. The configuration of the visual objects may include tiles or bounding boxes with certain length, width and height enclosing the image/visual object. Examples of visual objects include network infrastructure related objects such as network nodes, antenna arrays and relay nodes, as well as non-network related objects such as vehicles, buildings, barriers and signs;

Location or index of the visual object/marker relative to WTRU viewport: for example, the WTRU may be configured with the index of the tile/grid where the visual marker may be located relative to the set of tiles/grids associated with the WTRU viewport.

The different visual XR-RRM measurement objects configured in the WTRU may be referenced with different identifiers/indexes. An XR-RRM event related to visual sensing may include detection of a visual object/marker from the current WTRU location and determining the index associated with the visual object, for example. The configuration of the visual XR-RRM measurement objects may also include mobile visual objects where the movement of the visual object may be determined relative to the position and movement of the WTRU.

In one example of visual XR-RRM configuration, the WTRU may be configured to detect a first visual object and a second visual object. The WTRU may be further configured with a first XR-RRM event related to a distance estimation between the first visual object and second visual object, and a second XR-RRM event related to the second visual object overlapping on the first visual object, for example. In this case, the WTRU may determine the estimated time for the second XR-RRM event to occur (i.e. second visual object overlaps on the first visual object) when triggered by the first XR-RRM event (e.g. when the relative distance between the first and second visual objects is below a threshold distance). For example, the WTRU may be configured to perform visual sensing to detect a network node which is directly visible to the WTRU (first visual object) and visual sensing to detect a moving obstacle/barrier (i.e. second visual object) that may block the Line of Sight (LOS) communication link between the WTRU and a network node. Based on the configuration, the WTRU may estimate and report the remaining time to the network periodically prior to the obstacle blocking the LOS link, for example.

Examples of XR-RRM Events Related to Perceived QoE Performance

The WTRU may be configured to detect XR-RRM events related to the perceived QoE performance and to determine QoE measurement objects based on measurement and/or sensing. The QoE related events and measurement objects may include a combination of one or more QoS parameters including bit rate, latency and packet loss rate associated with the QoS flows (QoS Flow Identifiers (QFIs)) configured in the WTRU. For example, the WTRU may be configured with one or more upper and/or lower threshold values related to QoS parameters per QFI as XR-RRM events. Subsequently, the WTRU may make measurements of the QoS performance and record the measurements when the performance of the QoS parameter (e.g. latency) exceed the configured upper threshold value and/or drop below the lower threshold value. Subsequently, the WTRU may transmit these measurements to the network (e.g., to the serving gNB).

Additionally, for XR-RRM events related to QoE configured in the WTRU may include detection of distortion of one or more virtual objects overlaid in the WTRU viewport. The XR-RRM events related to QoE may be also be related to texture, depth, refresh rate, smearing of objects, judder, positioning and movement of the virtual objects relative to change in WTRU positioning and viewport, for example. The configuration of the XR-RRM events in the WTRU may also consist of one or more reference virtual objects along with QoE performance thresholds associated with the reference virtual objects. During run-time, the WTRU may make QoE performance measurements (e.g. judder, relative movement) of the application related virtual objects with respect to the configured reference virtual objects. The WTRU may record the measurements for reporting when the measured QoE performance difference exceeds the configured upper QoE performance threshold value and/or drop below the lower QoE performance threshold value, for example.

According to an embodiment, the WTRU may be configured to determine a latency metric associated with time difference between detection of sensor input (e.g., motion) and the actual update of the display (e.g., photon, rendering) i.e., motion to photon latency or motion to rendering latency. One component of this latency metric may be transmission latency, which includes the queuing time of packets (e.g. sensor and/or tracking information) in the WTRU, time for acquisition of transmission resources and transmission time including possible retransmissions and time for reception and processing of the response (e.g. video to be displayed). For example, the WTRU may be configured to report RRM event if the transmission latency (e.g., a preconfigured number of instances or average value over a time window) exceeds a threshold. According to an embodiment, the threshold may be configured such that the amount of motion sickness or discomfort is minimum. According to an embodiment, the threshold may be function of sensor data. According to an embodiment, the threshold may be a function of specific XR application.

WTRU May Determine Relative Priority Between XR-RRM Events and RRM Events and Perform an Action Thereof A WTRU may be configured both XR-RRM events based on sensing and RRM events based on reference signal measurements. In one solution, the WTRU may be configured to disable XR-RRM events when the XR application is not active or suspended. The WTRU may further be configured to enable XR-RRM events when the XR application is started or resumed. According to an embodiment, the WTRU may be configured to perform prioritization of events based on type of events. For example, the WTRU may treat XR-RRM events with higher priority than RRM events. According to another embodiment, the WTRU may be configured to perform prioritization of events based on specific events. For example, the WTRU may be configured with explicit priority associated with each XR-RRM event and RRM event. When a more than one event is triggered at the same time, the WTRU may determine reporting procedure based on priority associated with the triggered events.

WTRU Sends XR-RRM Reports to Network Based on Triggering of Reporting Events

According to an embodiment, a WTRU performs XR related sensing and sends XR-RRM reports to the network based on XR-RRM event triggers configured in the WTRU. The WTRU may be configured to send the information on the XR measurement objects in an XR-RRM report to the network after the configured XR-RRM event is triggered and a measurement/sensing of the XR measurement object is made. The WTRU may include the identifier of one or more configured events and the identifiers of the associated XR measurement objects in the XR-RRM report.

The WTRU may be configured to send the XR-RRM reports periodically or aperiodically (non-periodically) based on triggering of the configured XR events. For example, for aperiodic reporting, the WTRU may send the XR report immediately after the configured event is triggered and a measurement/sensing is made. Alternatively, the WTRU may send the XR-RRM reports consisting of logged information on the XR measurement objects, which may be accumulated over a certain configured duration. For example, the WTRU may be configured with a first event trigger and a second event trigger where the WTRU may initiate sensing of the XR measurement objects when the first event trigger occurs and subsequently logs the XR measurement objects until a second event trigger occurs prior to sending the accumulated/logged information in the XR-RRM report. For example, the first event trigger may be associated with start of a timer and/or first positioning/ location information and the second event trigger may be associated with stopping of the timer and/or second positioning/location information.

The WTRU may include the current and future timing and/or positioning information associated with the XR measurement objects when sending the XR-RRM report. For example, the WTRU may indicate a first timing information related to the current measurement/sensing made on an XR measurement object and a second timing information related to an expected (future) measurement/sensing of the XR measurement object, where the second timing information may be determined as an offset with respect to the first timing information. When sending proactively the expected measurement/sensing information in the XR-RRM reports, the WTRU may include information related to the likelihood of the measurement/sensing that is expected to occur for the XR measurement object. In one example, the WTRU may include in the XR-RRM report a first measurement information related to the current measurement of a XR measurement object and a second measurement information related to the expected/future measurement of the XR measurement object, where the second measurement information may be associated with a likelihood information (e.g., probability of occurrence).

The information related to XR measurement objects and sensing included by the WTRU in the XR-RRM report may consist of one or more of the following:

Positioning information: according to an embodiment, a WTRU may send information related to direction of WTRU viewport, visual range/depth associated with viewport, width/angle of field of view, geographic location of the WTRU (e.g., coordinates determined with a Global Navigation Satellite System (GNSS)), for example. According to an embodiment, a WTRU may also send proactive information related to the change in the WTRU positioning, which may be determined based on prediction or forecasting of the WTRU positioning trajectory. According to a further embodiment, a WTRU configured to perform RF measurements (e.g., Received Signal Strength Indicator (RSSI), RSRP) on reference signals may also include the RF measurements along with the positioning information (e.g., WTRU location) when sending the measurement reports to network;

Visual information: according to an embodiment, the WTRU may send information related to the visual images, compressed/uncompressed image frames of the video feed/stream captured by the image sensor, identifiers/indexes of the visual objects/spatial anchors configured in the WTRU and detectable via the image sensor. The sequence of the image frames showing the visual objects in the environment where the WTRU is located may be used to determine the motion of the WTRU, according to an embodiment. The visual information sent by the WTRU may also contain visual objects related to potential blockages (e.g., buildings, vehicles, walls, objects) in the communication path between the WTRU and the network nodes;

Motion/gesture information: according to an embodiment, WTRU may send information determined by the motion sensors including WTRU speed, rate of change in the rotation angle and tilt angle related to the WTRU viewport;

Control information: according to an embodiment, when configured to perform RF measurements, a WTRU may send channel feedback measurement information (e.g., per beam/per-cell RSRP of the Synchronization Signal Blocks (SSBs) and/or Channel State Information-Reference Signal (CSI-RS)) related to the beams accessible at current WTRU position. The WTRU may also send the identifiers/indexes of the beams that may be detectable and/or aligned with the direction of the WTRU viewport. In addition, the WTRU may include in the XR-RRM report the information on the detection of alternative nodes (e.g., relays, Transmission-Reception Points (TRPs), reflective surfaces) to extend the existing connectivity to the serving cell. According to another embodiment, the WTRU may include in the XR-RRM report the information related to the control or manipulation of RRM information (e.g., beams, configured grants, Random Access Channel (RACH) resources, references signals). In this case, the RRM information may be associated with virtual objects which may be configured to be controlled and accessed by the WTRU. For example, the WTRU configured with the capability to pull one or more beams towards its direction may include the control information related to pulling of virtual objects associated with beams along with the beam identifier in the XR-RRM report.

Request for RRM information: according to an embodiment, a WTRU may send in the XR-RRM report a request indicating the type of the RRM information required by the WTRU. For example, the WTRU may request information on the beams that may be available at current WTRU position and at a future WTRU position by indicating the associated positioning and timing information in the XR-RRM report;

Encoding information of virtual objects: in the scenario where the WTRU performs rendering and overlaying of RRM information (e.g., virtual objects associated with cell coverage, QoS) in the WTRU display component, the WTRU may send in the XR-RRM report the supported dynamic encoding parameters including bitrate and refresh frequency, for example.

XR-RRM reports may be sent in the following:

RRC: a WTRU may be configured with one or more SRBs to send the XR-RRM reports to the RRC entity in the network. The Logical Channels (LCHs) associated with the SRBs may be configured with different LCH parameters related to the type of the information in included in the XR-RRM report. For example, the WTRU may be configured with a first set of LCH parameters (e.g., priority, Prioritized Bit Rate (PBR), Packet Delay Budget (PDB)) to send information related to positioning sensing and a second set of LCH parameters to send information related to visual sensing;

UL data: a WTRU may be configured with one or more Dedicated Radio Bearers (DRBs) to send the XR-RRM reports to an RRM entity or a trusted application function in the network. For example, the WTRU may be configured to send the information related to visual sensing to an application function using at least one configured DRB while the positioning information may be sent to an RRM entity using a different configured DRB;

MAC CE: a WTRU may be configured to send information related to positioning sensing and/or visual sensing in one or more UL MAC CEs, where different identifiers (e.g., Logical Channel ID (LCID)) used in the MAC CE may be associated with the type of XR information. For example, the WTRU may send the information on the WTRU viewport direction in a MAC CE using a first identifier and the information on the detection of a visual object (e.g. index of the visual object) in another MAC CE using a second identifier;

Higher layer control plane (CP) signaling: a WTRU may be configured to send XR RRM reports to a CP function/entity in the core network (CN). For example, the WTRU may send the XR RRM reports in one or more NAS messages to a CP function/entity. The WTRU may send the NAS message(s) when the WTRU is configured to perform measurements and/or detection of one or more XR objects (e.g. objects such as TRPs/gNB, blockages, etc.) by the associated CP function/entity, for example.

WTRU Configured to Use Non-RF Signals/Resources for Data Communications and XR Sensing and Reporting According to an embodiment, a WTRU may be configured to perform data communications and/or positioning/sensing using non-RF signals. Herein, non-RF signals may refer to any signals/resources and/or sets of signals/resources, related to non-RF frequencies such as infrared, laser, lidar, free-space optical transmission, etc. According to an embodiment, the signals/radiation in the THz frequency bands (e.g. 0.3 THz to 3 THz) which may have quasi-optical characteristics resembling those of optical signals (e.g. infrared, laser) in terms of directivity, beamwidth, and penetration loss, for example, may also be considered as non-RF signals. The WTRU may be configured with non-RF signals/resources by the network (e.g. via dedicated RRC signaling, broadcast SIB, MAC CE) for performing data communications and/or positioning/sensing, for example.

Regarding data communications, the non-RF signals/resources may be used by a WTRU for transmission and reception of data between WTRU and network (e.g. TRP/gNB) via Uu interface or between different WTRUs via sidelink interface, for example. Regarding positioning/sensing, non-RF signals/resources may be used by a WTRU for sensing/tracking actions including determining the presence of an object/blockage/barrier, determining the distance to an object, determining the location of the WTRU (e.g. based on detection/measurements of non-RF signals received from transmitters such as TRPs/gNBs or other WTRUs/devices).

As an example, the non-RF based data communications and positioning/sensing performed by WTRU may refer to any actions associated with XR related sensing and sending of XR-RRM reports to the network based on XR-RRM event triggers configured in WTRU, as defined in another section of this invention. The WTRU may be configured to use the non-RF signals along with RF signals for data communications and/or positioning/sensing actions (e.g. XR sensing), for example. Hereafter, data communications using non-RF and/or RF signals may refer to transmission and/or reception of UP and/or CP data as well as measurements of the channels used for data communications.

The architectures for supporting non-RF based communications, possibly along with RF-based communications, may include at least of the following:

Standalone non-RF entity: Consists of application-layer processor/function, protocol-layer processor/function (e.g. includes SDAP, PDCP, RLC, MAC sublayers), non-RF modem (e.g. optical modulator/demodulator that may support PHY layer functions and/or high frequency baseband modem for modulation/demodulation of THz frequency bands and associated PHY layer functions) and non-RF transceiver (e.g. laser transmitter/receiver and/or THz frontend transmitter/receiver);

Mixed/hybrid non-RF and RF entities:

Consist of common application-layer processor/function and one or more independent protocol stacks/functions for RF and non-RF entities. For example, each RF and non-RF entities may consist of end-to-end protocol stack (e.g. SDAP, PDCP, RLC, MAC sublayers) and PHY layer functions (e.g. supported by baseband modem for RF entity or optical modem for non-RF entity) and transceiver units (e.g. supported by RF front-end for RF entity and optical/laser transmitter/receiver for non-RF entity);

Consist of common application-layer processor/function and split protocol stacks with common SDAP and/or PDCP functions. For example, each RF and non-RF entities may consist of one or more partial protocol stacks (e.g. PDCP, RLC, MAC) and PHY layer functions (e.g. supported by baseband modem for RF entity or optical modem for non-RF entity) and transceiver units (e.g. supported by RF front-end for RF entity and optical/laser transmitter/receiver for non-RF entity);

Consist of common application-layer processor/function and split protocol stacks with common MAC layer/function. For example, each RF and non-RF entities may consist of individual PHY layer functions (e.g. supported by baseband modem for RF entity or optical modem for non-RF entity) and transceiver units (e.g. supported by RF front-end for RF entity and optical/laser transmitter/receiver for non-RF entity)

The different architectures, as described above, may be used for non-RF based communications in conjunction with the RF-based communications, including reception of XR RRM configurations and reporting of XR RRM measurements/reports, for example. For example, the non-RF entities in the WTRU (e.g. optical receiver and/or optical modem) may be used for receiving and/or performing measurements (e.g. XR RRM) of the received non-RF signals (e.g. infrared, laser, free-space optical), including any non-RF signal components that may be received along with RF signals. The RF entities may be used by WTRU for receiving and/or performing measurements of the RF signals, including any RF signal components that may be received along with non-RF signals, for example. The different architectures/entities for supporting non-RF based communications, possibly along with RF-based communications, may be applied at the WTRU and/or at network nodes (e.g. TRPs/gNBs), for example.

The possible ways in which the non-RF and RF based entities in the different architectures may be used for transmission/reception of data by the WTRU and/or network node may be based on different criteria/conditions. The criteria/conditions for determining whether to use the one or more non-RF entities and/or RF entities may include one or more of the following:

UP/CP data transmission: For example, the UP data may be transmitted/received using the non-RF entity and CP data may be transmitted/received by using RF entity, and vice-versa;

UL/DL transmission: For example, the UL transmission may be performed using non-RF entity and DL reception may be performed using RF entity, and vice-versa;

LOS/NLOS transmissions: For example, the non-RF entity may be used for performing transmission/reception over LOS links and the RF entity may be used for performing transmissions/reception over NLOS links, and vice-versa.

Short/Long range transmissions: For example, the non-RF entity may be used for performing transmission/reception over short-range links and the RF entity may be used for performing transmissions/reception over long-range links, and vice-versa;

Channel conditions: For example, the data may be transmitted/received using the RF entity when the channel conditions over RF carriers are favorable (e.g. RSRP is above threshold). Likewise, data may be transmitted/received using non-RF entity when the channel conditions over RF carriers are poor (e.g. RSRP is below a threshold), for example. Similar channel conditions of non-RF carriers may be used when deciding whether to use RF-entity and/or non-RF entity for data communications;

Uu and/or SL transmission: For example, transmission/reception over Uu interface may be performed using RF entity and transmission/reception over SL interface may be performed using non-RF entity, and vice-versa;

Positioning/sensing and data communications: For example, the non-RF entity may be used for performing positioning/sensing actions and the RF entity may be used for performing transmissions/reception of data, and vice-versa;

Reciprocity: For example, when receiving data from another WTRU or a network node using non-RF signals the non-RF entity in WTRU is used for transmission of data. Likewise, when data from another WTRU or network node using RF signals the RF entity is used for transmission of data. In another example, when making measurements on non-RF signals, the measurement reporting is performed using non-RF signals/non-RF entity, and vice-versa for RF signals;

Unconditional: For example, both RF and non-RF entities may be used interchangeably for data transmission/reception in all scenarios, irrespective of any conditions/criteria. In an example, reception of data using non-RF signals may be performed using non-RF entity and transmission of data (e.g. response message, ACK/NACK feedback) may be performed using RF signals/RF entity.

The criteria for determining whether to use non-RF entity and/or RF entity at WTRU for performing data transmission/reception, as described above, may be configured in the WTRU by network (e.g. via RRC signaling, MAC CE), for example. The WTRU may then determine the usage of non-RF entity and/or RF entity when one or more of the criteria/conditions are satisfied, for example. In another example, the WTRU may determine whether to use non-RF entity and/or RF entity based on higher layer/application layer indication.

The different architectures for supporting non-RF based communications may also be applied for supporting positioning/sensing actions (e.g. XR sensing). For example, a probing transmission containing an encoded non-RF signal (e.g. laser or infrared) may be transmitted using a non-RF entity when performing an XR sensing action (e.g. active sensing). Similarly, an encoded non-RF signal (e.g. laser or infrared) may be received from another WTRU or network node using a non-RF entity when performing an XR sensing action (e.g. passive sensing).

Hereafter, aspects related to the usage of non-RF signals, including usage of a combination of one or more entities, architectures, criteria/conditions related to non-RF signals described above, for data communications and/or positioning/sensing/tracking, are applicable to other sections in this invention referring to non-RF signals.

WTRU Sends XR-RRM Reports to Network on Blockages Based on XR Detection/Reporting Configuration According to an embodiment, a WTRU may be configured to perform detection of one or more blockages and send RRM/XR-RRM reports based on detection and/or reporting configuration received from a network. The impact of a blockage to a communication path/link between a transmitter (e.g. TRP/gNB) and a receiver (e.g. a WTRU) may result in the received LOS or NLOS signal to drop below a threshold and remains below the threshold over a time duration, for example. In this case, the drop in the signal quality/strength due to the presence of a blockage may be determined by a WTRU or TRP/gNB based on measurements made (e.g. RSRP, RSSI, RSRQ) on the beam or SSB. In an example, the blockage may correspond to any static or mobile object (e.g. physical barrier, building, vehicle) that may block or obstruct the communication path/link between a TRP/gNB and the WTRU. The blockage may also as refer to an obstruction that may block a beam transmitted by TRP/gNB or WTRU. In some examples, the blockage may correspond to any object that may obstruct the link between the WTRU and the existing source/serving TRP/gNB and/or a neighbor TRP/gNB (e.g. potential target TRP/gNB) to which the WTRU may establish connectivity. The detection of blockage by the WTRU may be considered as one of an XR-RRM event, which may possibly result in triggering of one or more actions, including searching/sending for an alternative beam and/or a network node for establishing connectivity, for example. Alternatively, other actions that may be triggered as a result of detection of a blockage may include the WTRU sending a report (e.g. RRM measurement report, XR-RRM report) on the detected blockage to the serving cell/gNB and/or sending a request for determining alternative connectivity (e.g. new beam, new network node), for example.

The WTRU may be configured by network to perform detection of blockages, where the WTRU may receive the configuration, possibly as assistance information, to perform the detection. The WTRU may receive the configuration based on the WTRU capability information and/or other positioning information provided by WTRU to the network. For example, the WTRU may indicate to the network its capability to perform sensing using one or more in-built sensors or sensors accessible by WTRU (e.g. visual sensors, cameras, lidar, infra-red sensors, THz transceiver). In another example, the WTRU may indicate to the network the capability for performing sensing, including positioning, tracking, localization, using RF-signals and/or non-RF signals, with RF and/or non-RF entities. The WTRU may possibly indicate to the network the WTRU positioning information (e.g. location, measurements of positioning reference signals, viewport/WTRU orientation information) for receiving the configuration on blockage detection.

According to an embodiment, the WTRU may receive the configuration on blockage detection and/or blockage reporting in one or more of the following:

RRC signaling: For example, the WTRU may receive the configuration from an RRC and/or RRM entity in the network;

Lower layer signaling: For example, the configuration and/or an activation/deactivation indication of a pre-configuration associated with different blockages may be received by WTRU in MAC CE or DCI;

CP signaling: For example, the WTRU may receive the configuration in NAS message from a core network (CN) function (e.g. AMF, XR entity/function);

Higher layer/application: For example, the WTRU may receive the configuration from one or more applications functions, possibly transparent to gNB in RAN. In an example, the WTRU may receive configuration information on the location of the blockages from an application function. The WTRU may also receive other configuration information on the location of the TRPs/gNBs from the network (e.g. via RRC or NAS messages). The WTRU may combine the received configuration information from application and network for determining/estimating the presence of the blockages relative to the TRPs/gNBs, for example.

According to an embodiment, the configuration received by WTRU for detecting/identifying the blockages may consist of one or more of the following:

Triggering conditions/XR-RRM events: For example, the WTRU may receive one or more triggering conditions for initiating monitoring and/or detecting of blockages. The triggering conditions may include conditions related to WTRU positioning (e.g. WTRU initiates monitoring when WTRU location and/or viewport orientation changes by a certain threshold distance/angle), RF measurements (e.g. WTRU initiates monitoring when RSRP of SSB/beam received from serving cell reduces/increases by a threshold) and/or network/higher layer indication, for example;

Assisting signals/resources for blockage detection: For example, the WTRU may receive one or more RF (e.g. RF/microwave signals, RACH, RF beams, THz carriers, short-range pulses) and/or non-RF (e.g. lidar, infra-red, laser, free-space optical transmission) signals/resources and/or sets of signals/resources that may be used for transmission and reception when detecting the presence of blockage. The configuration consisting of signals/resources for blockage detection may be associated with one or more parameters, including sequence pattern (e.g. code, preamble), time/frequency resource set, power/amplitude, pulse width, periodicity and beam parameters (e.g. index, width) for example. The WTRU may use the one or more signals/resources and the associated parameters for transmitting and/or making measurements on the received signals (e.g. reflected/refracted signals) for determining the presence of the blockage, for example. The set of signals/resources received by WTRU for blockage detection may also be associated with the type of a blockage (e.g. building, vehicle). For example, the WTRU may use a first set of signals/resources for detecting a first blockage type and a second set of signals/resources for detecting a second blockage type. The WTRU determine the blockage type based on network indication and/or positioning information, for example;

Measurement parameters: For example, the WTRU may receive the measurement parameters associated with the detection of blockages including RF measurements (e.g. RSRP thresholds), non-RF measurements (e.g. infra-red signature, lidar signature) and/or visual detection (e.g. similar visual objects, similarity measure, cross-correlation coefficients). In this case, the WTRU may use the received measurement parameters and perform comparison with respect to the measurements made on the potential blockages for determining the presence of the blockage, for example;

Area/location of blockage(s): For example, the WTRU may receive estimated one or more locations of potential blockages which can be used for triggering the monitoring and detection of blockages. In an example, the WTRU may initiate monitoring for the presence of blockages when entering into an area indicated by the network in the configuration. In another example, the WTRU may receive in the configuration the location information of the TRPs/gNBs and possibly the associated radial distance/range from the TRPs/gNBs. In this case, the WTRU may initiate monitoring for the presence of blockages when the distance between the WTRU and TRP/gNBs location is less than or equal to the associated radial distance/range. In some examples, the WTRU may determine the location of the objects/blockages based on higher layer/application indication, which can then be used for triggering the monitoring for the presence of blockages obstructing the communication path between the WTRU and TRP/gNB;

Size/shape of blockage(s): For example, the WTRU may receive one or more preconfigured sizes and/or shapes of different objects/blockages from the network. The different sizes/shapes may be associated with an index/identifier. Upon detection of the blockage, the WTRU may estimate the size and/or shape and map the estimation to a preconfigured index/identifier. The WTRU may then report to the network the identified index/identifier corresponding to the detected blockage, for example.

Timing information associated with blockage: For example, the WTRU may be configured with timing information on when a blockage may be detected, the time duration for the blockage to be present and/or when a blockage may be cleared.

According to an embodiment, the WTRU may determine/detect the presence of blockages using a combination of one or more of the following approaches:

Visual sensing: For example, the WTRU (e.g. XR device, XR glasses) with capability to perform visual sensing using one or more cameras/visual sensors may detect the presence of blockage(s) based on image capturing and/or image processing. The WTRU may also estimate the distance/range from the WTRU to the location of the blockage and/or from the TRP/gNB location to the location of the blockage using cameras with capability to capture depth images (e.g. RGB-D), for example. The image processing for determining the presence of the blockage may be performed either using processors on-board the WTRU or upon offloading to an external processor/function in a proximity device (e.g. smartphone) or network (e.g. edge function), for example;

RF-based sensing: For example, the WTRU may detect a blockage based on passive RF sensing or active RF sensing. In this case, passive RF sensing may include measurements made from a RF source (e.g. another WTRU, TRP/gNB), in which case the WTRU may determine or infer the presence of a blockage when the RSRP measurements between the RF source and WTRU drops below a threshold, for example. Alternatively, active RF sensing may include the transmission of RF signals (e.g. RACH, beams, short range pulses) in one or more directions. In this case the WTRU may perform detection of a blockage based on the measurements made on the received reflected/refracted signals, for example;

Non-RF based sensing: For example, the WTRU may detect the presence of blockage using lidar and/or infra-red sensors accessible by WTRU. In this case, the WTRU may send lidar or infra-red pulses/signals and detect the blockage based on the measurements made on the received reflected/scattered signals. The WTRU may use a set of one or more parameters (e.g. sequence pattern/code, pulse width) in the transmitted lidar/infrared signals that may improve quality and robustness of received signal and correspondingly, the accuracy and reliability of detecting the presence of blockage. Alternatively, in the case when the TRPs/gNBs may perform the transmission of non-RF signals (e.g. lidar, infrared), the WTRU may detect the presence of a blockage based on the measurements made on the received/reflected non-RF signals.

According to an embodiment, the WTRU may send reports (e.g. RRM, XR-RRM report) to network upon determining the presence of blockage based on the blockage reporting configuration received from the network. The WTRU may send the reports entirely or at least in part to one or more of the following: RRM/RRC entity in the network (via RRC signaling or low layer signaling such as MAC CE or UCI), CN function/entity (e.g. AMF, XR function, UPF) in CN (via NAS/CP signaling or UP signaling) and/or application function. The information that may be sent by the WTRU in the report, possibly in accordance with the reporting configuration, may include one or more of the following:

Location information of blockage(s): For example, the WTRU may report the location of the blockage, where the location information may possibly include the current location and/or trajectory (e.g. past location at T-t and expected future location at T+t, where T corresponds to the current time and t is an offset time duration). The location information of the blockage reported by WTRU may include either absolute location (e.g. geographic coordinates) or relative location (e.g. distance relative to the location of WTRU, location of TRP/gNB and/or location of a pre-configured landmark); According to an embodiment, the WTRU may include the mobility information of the blockage (e.g. absolute and/or relative to WTRU), including the speed, direction and orientation of the blockage.

Physical attribute(s) of the blockage(s): For example, the WTRU may report on the attributes related to the physical size (e.g. height, width, thickness) and/or shape of the blockage. The WTRU may determine/estimate the physical attributes based on a combination of at least one of visual sensing, RF-sensing and non-RF sensing, for example. When reporting the WTRU may send information on the estimated physical dimensions of the blockage. In another example, where the WTRU may be preconfigured with a mapping between a set of reference blockage sizes/shapes to indexes/IDs, the WTRU may report the indexes/IDs corresponding to the detected blockage that have matching parameters in the preconfigured mapping;

Timing information of blockage(s): For example, the WTRU may report on the estimated time related to a blockage between the WTRU and TRP/gNB on the following: expected time when the blockage may start obstructing, duration where the blockage may remain obstructing and/or expected time where the blockage may no longer obstruct. For example, the WTRU may report a blockage may obstruct a link in the next T1 seconds, remain obstructing the link for a duration of T seconds and/or clear in the next T2 seconds. The WTRU may determine the timing information related to the blockage based on the estimation of the movement of the blockage and/or movement of WTRU relative to a TRP/gNB and/or detected blockage, for example. The WTRU may report the timing information in the form of absolute time or relative time (e.g. number of frames and/or number of counts during detection attempts where the blockage is expected to obstruct the communication path/link), for example;

Statistical metric: For example, the WTRU may calculate a statistical metric indicating the probability of a blockage obstructing the link/path to a TRP/gNB as a function of at least one of the following: estimated physical size of the blockage, estimated location of the blockage, location of the TRP/gNB, location of the WTRU, velocity of the WTRU, velocity of the blockage, estimated time duration for the blockage to remain obstructing the path/link between WTRU and TRP/gNB. In this case, calculated probability may be estimated to be a higher value when the size of the blockage is high and/or the velocity of the WTRU is low, for example;

Visual image of blockage(s): For example, the WTRU may include in the report one or more image frames or video frames, captured with cameras/images sensors, related to the detected blockage and/or the presence of a blockage obstructing the communication path/link between WTRU and TRP/gNB. The image frame(s) sent by the WTRU in the report may consist of RGD-D images, which may include encoded information from which the depth/range from the WTRU to the blockage may be determined, for example;

RF and/or non-RF measurement information: For example, the WTRU may report the measurements made on the signals received directly from a blockage or indirectly from an RF or non-RF source. For example, the indirect signals may include transmissions from a TRP/gNB or another WTRU which are impacted by the presence of the blockage. In another example, the WTRU may also report RF measurements on reflections received from the signals and/or beams transmitted by WTRU. The WTRU may include information related to measured signal strength/quality (e.g. RSRP, RSRQ, RSSI), signal phase, and/or beam index/ID when sending the measurement report.

WTRU Sends Indication to Request for UL Resources for Data when Sending XR-RRM Reports According to an embodiment, where the WTRU may be configured to send XR-RRM reports based on XR-RRM event triggers, the WTRU may indicate the request for resources to send UL data in the same transmission used for sending the XR-RRM reports. Specifically, when the WTRU is configured with XR-RRM event triggers which may be similar and temporally aligned with the event triggers configured for sending UL data associated with an XR application, the resources for sending the UL data may be requested in the XR-RRM report. The indication corresponding to the request for resources sent by the WTRU along with the XR-RRM report may reduce the latency associated with scheduling for sending Scheduling Request/Buffer Status Report (SR/BSR) for the UL data. Based on the indication, the WTRU may be may assigned by the network with UL resources for sending the UL data or XR-RRM report.

The request for resources for sending UL data and/or XR-RRM report may be sent in the following:

Indicator in XR-RRM report: The WTRU may indicate the traffic volume of the UL data in XR-RRM report, when UL data is available in the LCH buffer;

Indicator in configured grant: for example, when the WTRU is configured with configured grant to send either XR-RRM reports or UL data periodically, the WTRU may include a flag/indicator for indicating a request for resources for UL data transmission or for XR-RRM reports;

Indicator in BSR: for example, when the WTRU sends a BSR to request for resources for sending UL data, the WTRU may include a flag/indicator in the BSR to request resources for sending the XR-RRM report.

WTRU Receives XR-RRM Information/Objects from Network in Response to Measurement and Sensing Information Sent in XR-RRM Report According to an embodiment, the WTRU may receive XR-RRM information/objects dynamically based on the transmission XR-RRM report containing information on positioning and visual sensing. The XR-RRM information received by the WTRU may further contain information on the validity position range and validity time duration where associated XR-RRM information is valid and applicable.

The XR-RRM information/objects received by the WTRU may be time-warped and/or space-warped to account for changes in the WTRU positioning since the transmission of the last XR-RRM report. For example, the WTRU may transmit in the XR-RRM report the positioning information corresponding to a (current) first position of the WTRU. Subsequently, the WTRU may receive RRM information corresponding to a second position of the WTRU, where the second position may be associated with the change from the first position of the WTRU since sending the XR-RRM report.

The types of XR-RRM information provided to the WTRU may include one or more of the following:

Cell coverage information: for example, the cell coverage may be indicated to the WTRU as the expected received signal strength (e.g., CSI-RS) at different locations for one or more cells which may be accessible with certain proximity from the WTRU. The cell coverage information may include the coverage related to the serving cell associated with the WTRU and one or more neighboring cells. The cell coverage information may also be indicated as a 2D or 3D contour object or heatmap object where the points on the contour/heatmap may correspond to the expected received signal strength at different locations;

Available beams: for example, the WTRU may be receive RRM information related to the availability of one or more LOS beams, including beam related information on the location of origin and angle of departure relative to the WTRU positioning, which may be accessed by the WTRU. Additional information on beam availability may include potential beams and/or Non-Line of Sight (NLOS) beams which may be hidden from the current WTRU viewport, which may be accessible by WTRU at a different proximate location;

Available connectivity nodes: for example, the WTRU may receive RRM information on the target connectivity nodes (e.g., target gNBs, TRPs, relay nodes) that may be accessed by WTRU for potential handover. The WTRU may receive visual objects/images related to one or more connectivity nodes that may be visually detectable by WTRU based on visual sensing. The WTRU may also receive the configuration information (e.g. radio bearer configuration, RACH resources) associated with the connectivity nodes for potential handover, for example. In another example, the WTRU may receive conditions for handover, possibly related to visual sensing and/or RF measurement associated with the connectivity nodes, which the WTRU may evaluate prior to establishing connectivity with a target connectivity node;

Achievable QoS information: a WTRU may be indicated with the information related to the QoS performance achievable at different locations proximate to the WTRU for one or more applications that are supported by the WTRU, for example. The QoS performance may include the data rate, latency and reliability achievable per QoS flow (QFI) and/or application at different locations and time durations;

Service availability: for example, the services available may be indicated based on the network slices configured and allowed to be accessed by the WTRU. The indicated service availability information may be associated with different geographic locations which may be correlated with positioning of the WTRU. The service information may also be indicated along with the expected traffic load corresponding to the service at different geographic locations and time durations, for example;

Resource information: for example, the WTRU may receive RRM information related to resources which are configured at certain locations/zones. The WTRU may access the resources for UL transmissions when the WTRU arrives in the location/zone configured with the resources. Examples of resource information may include configured grants, reference signals, beams, RACH resources which may be assigned based on the WTRU positioning information.

Determining RRM Information for Adaptive Overlay

WTRU Determines the Placement and Overlaying of the XR-RRM Information/Objects Relative to WTRU Viewport According to an embodiment, the WTRU may receive XR-RRM objects along with encoding attributes which may be applied by the WTRU for appropriately rendering and/or overlaying the XR-RRM objects in the WTRU display component. Specifically, the received XR-RRM objects may include encoding attributes related to timing and positioning which indicate the time and position when/where the objects may be rendered and overlaid. The XR-RRM objects and the associated encoding attributed may be received based on the information related to WTRU positioning and visual sensing sent by the WTRU in the XR-RRM report. The different XR-RRM objects received for rendering and/or overlaying may be associated with the following:

Object parameters: The parameters related to the 2D or 3D objects may include object identifier, size, texture and shading, for example;

Positioning information: for example, the positioning associated with the XR-RRM objects may include 3D coordinates of the object, relative positioning of object including distance from the WTRU, the identities/indexes of the tile/grid in WTRU viewport where the object may be displayed;

Timing information: for example, the timing associated with the XR-RRM object may include the start time when the object may be overlaid and/or the stop time when the object may be removed from display.

According to another embodiment, the WTRU performs local processing based on up-to-date WTRU viewport parameters and/or positioning information to determine the corrections/adjustments that may be applied to the received XR-RRM information prior to rendering and overlaying the processed RRM information in the WTRU display component. For example, the WTRU may receive a first XR-RRM object (e.g. beam) associated with the first visual object (e.g.

antenna array) and positioning of the first visual object determined by the WTRU. Next, the WTRU may determine a second visual object, where the second visual object is correlated with the first visual object and different from the first visual object due to the change in WTRU positioning. The WTRU may further determine the correction parameters based on the difference between the first visual object and the second visual object. Subsequently, the WTRU may apply the correction parameters, including change in size, change in orientation and relative movement, to the first XR-RRM object to derive a second XR-RRM object. The WTRU may then overlay the derived second XR-RRM on the second visual object in the display component.

According to another embodiment, the WTRU may determine the appropriate placement of the XR-RRM objects in the WTRU viewport by applying LOS and NLOS based corrections prior to rendering and/or overlaying. The corrections may be made such that the visible LOS objects are displayed directly in the WTRU viewport and objects which are hidden (e.g. blocked by a building) are displayed with appropriate NLOS adjustments and representations, including cropping and resizing of the XR-RRM objects, for example.

In certain scenarios the WTRU may receive the XR-RRM objects from different entities in the network (e.g. RRM entity, application function), where the different entities may use different localization and positioning coordinates when generating the RRM information/objects. In this case, the WTRU may apply corrections/adjustments to the XR-RRM objects by converting the positioning and timing information provided with the objects to a common positioning/timing system applied in the WTRU when rendering and overlaying, for example.

According to an embodiment the WTRU may be configured to overlay the XR-RRM objects or a virtual representation thereof within the field of view of the user. Such overlayed information may enable the user to interact with the environment so that the one or more aspects of wireless transmissions may be enhanced. For example, the WTRU may be configured to overlay a representation of signal quality (e.g., heatmap or navigational path to areas with better signal or other visualization thereof) over the real-world imagery. Such information may enable user to visualize the potential signal quality and/or status of blockages in the immediate environment. The user may then choose to move to the areas with better signal reception. Possibly the WTRU may guide the user to adjust position/rotation with regard to accessory, IoT device or even relative position between user and the XR device to enable better signal reception. According to another embodiment, the WTRU may be configured to guide the user towards better signal reception based on non-visual means. For example, the WTRU may include the user about the expected signal strength in a specific direction possibly using haptic/sensory effects. Another sensory mechanism may also be envisioned including but not limited to auditory, temperature, haptics or force feedback.

Determining Extended Connectivity Based on XR Sensing

WTRU Determines Potential Alternative Connectivity to a Network Node Based on Sensing and Received RRM Configuration/Information According to an embodiment, the WTRU may perform XR related sensing to determine one or more alternative connectivity options for either extending the existing connectivity to the serving cell (e.g. serving gNB) or establishing new connectivity to a target cell (e.g. target gNB). The alternative connectivity options that may be determined by the WTRU may include alternative beams, cells, relay nodes, TRPs, sidelink relay WTRUs and intelligent reflective surfaces, for example.

The WTRU may be configured by the network with criteria for identifying the candidates of alternative connectivity options based on sensing. The WTRU may also be configured to perform local positioning-based processing for determining the feasibility of the identified candidates to extend the connectivity. For example, the WTRU may determine a first set of candidate connectivity options based on first configured criteria. The WTRU may then determine a second set of candidate connectivity options from the first set of candidates using a second configured criteria. In this case, the first configured criteria may include the criteria for triggering the sensing of the candidate connectivity options and the second configured criteria may include the criteria for selection of the connectivity options, for example.

The criteria for triggering the sensing of the candidate connectivity options, which may be configured in the WTRU, may include one or more of the following:

Detection of potential link blockages: for example, the WTRU may be configured to trigger sensing based on the detection of potential blockages that may obstruct the LOS communication path between the WTRU and the serving cell. The WTRU may be detect the potential link blockages based on visual sensing of the blocking object (e.g. vehicle, barrier) and/or positioning sensing of the relative movement of the blocking object with respect to the WTRU, for example;

Vicinity to alternative connectivity nodes: for example, the WTRU may configured with the positioning information (e.g. coordinates) related to one or more alternative connectivity nodes and may trigger sensing when the position of the WTRU is within a certain threshold distance from the configured position of the alternative connectivity node;

Timing: the WTRU may be configured to perform sensing to identity the candidate connectivity options periodically based on a configured periodicity value and/or a sensing duration;

Indication from serving cell: for example, the WTRU may trigger sensing upon reception of an indication from the serving cell to identify candidate alternative connectivity options. The indication to trigger sensing may include the attributes related to the candidate connectivity options, including identifiers, positioning information and visual information, for example.

The WTRU may determine the candidate connectivity options, when the criteria for triggering the sensing of the candidate connectivity options are satisfied, based on following sensing techniques:

Active sensing: For example, the WTRU may perform sensing by sending probing transmissions and receiving the connectivity response indication. The probing transmission sent by the WTRU may include sounding reference signals (SRS), random access preamble, node discovery request or preliminary/initial access request (e.g. on Uu interface and/or SL interface), infrared beams, for example. The received connectivity response indicator may include beam selection indicator, RACH response, initial access response, and RF backscatter, infrared reflections, for example. For example, the RF backscatter received by a WTRU may be modulated into a signal understood by the WTRU (e.g. representing the connectivity response indicator) by an intelligent reflective surface in response to the probing transmission sent by WTRU. In another example, the WTRU may receive the connectivity response indicator via non-RF signals including infrared transmission, laser transmission, lidar transmission, free-space optical transmission. The WTRU may receive the resources for sending probing transmissions and other configuration parameters on accessing connectivity options (e.g. number of probing transmissions, amount of resources for sending reference signals, periodicity configured for sending reference signals, Tx power, RACH occasions, beam indicator) from the serving cell during configuration of the criteria for triggering the sensing, for example;

Passive sensing: For example, the WTRU may perform sensing by monitoring of connectivity availability indicators including reference signals and broadcast transmissions from network nodes (e.g. System Information Block (SIB), discovery announcement messages) or relay WTRUs in sidelink (e.g. Physical Broadcast Channel (PSBCH)). WTRU may also perform visual sensing based on relative positioning of WTRU and candidate connectivity nodes (e.g. relays, TRPs, reflective surface), for example.

The WTRU may further refine the selection of the candidate connectivity options from the candidates identified via sensing using a connectivity selection criterion. The criteria for selection of the connectivity options, which may be configured in the WTRU, may include one or more of the following:

Robustness of the link/beam: For example, the WTRU may select a beam as a candidate for connectivity if the beam may be accessed without blockages/interruptions in the communication path between the WTRU and a network node (e.g. target cell) for a certain configured time duration;

Transmission range: For example, the WTRU may select a connectivity option (e.g. reflective surface) as a candidate is the estimated multi-hop transmission range from the WTRU to the connectivity option and subsequently to the serving network node is below a certain configured distance threshold. The WTRU may estimate the multi-hop transmission distance based on local processing and simulation of beam raytracing, for example;

End-to-end transmission latency: The WTRU may select a connectivity node (e.g. relay) as a candidate if the estimated transmission latency from WTRU to the network node via the connectivity node is below a configured delay threshold value, for example;

RF measurements: For example, the WTRU may select a connectivity option as a candidate if the RF measurements (e.g. RSSI, Signal-to-Noise Ratio (SNR)) made on the reference signals (e.g. SSB, CSI-RS) associated with the connectivity option are above a certain configured measurement threshold and the measurements remain above the threshold for a certain time duration.

WTRU Sends Information on Selected Connectivity Options for Ensuring Path Continuity to Serving gNB According to an embodiment, the WTRU may send an indication to the serving cell (e.g., serving gNB) for establishing connectivity with one or more of the candidate connectivity options/nodes determined by the WTRU based on sensing and the connectivity selection criteria configured in the WTRU.

The indication, sent to the serving cell, for establishing connectivity may include the following information:

Identifiers of one or more candidate connectivity nodes;

Time for link degradation: for example, the WTRU may indicate the estimated time for the existing link/beam used by the WTRU for communicating with the serving node to degrade (e.g. link RSRP measurement falls below a threshold value). The estimated time may also indicate the time for the existing LOS link to transition to NLOS, due to link blockage, for example;

Time for link improvement: For example, the WTRU may indicate the estimated time for a potential link/beam which may connect the WTRU and a candidate connectivity node (e.g. target cell) to transition from NLOS to LOS.

The WTRU may then receive information (e.g. beam identifier, RACH resources) for extending connectivity when the selected connectivity option/node is associated with the serving cell. The WTRU may also receive further configuration information (e.g. handover command, conditional handover command) for establishing connectivity when the selected connectivity option/node is a target cell or associated with a target cell.

UE Performs Preliminary Link Establishment with an Alternative Connectivity Node According to an embodiment, the WTRU may send a preliminary connection establishment request directly to one or more of the selected candidate connectivity options/nodes determined based on sensing. In this case, when the selected candidate connectivity node is either a target cell or a connectivity node associated with a target cell, the preliminary connection establishment request may consist of a request for future Handover (HO). The preliminary connection establishment request may further consist of information on WTRU identifier (e.g., Cell Radio Network Temporary Identifier (C-RNTI)), identifier of the serving network node (Cell ID) and the expected time duration prior to triggering of HO, for example.

The WTRU may then receive a first connection establishment response message from the candidate connectivity node indicating the acknowledgement for establishing connection with the connectivity node. The connection establishment response message may be received after the candidate connectivity node performs admission control based on the preliminary connection establishment request sent by the WTRU, for example. The connection establishment response message may further consist of the target cell ID, new C-RNTI and timing information indicating the time duration for which the preliminary connection may be reserved for the WTRU prior to performing handover.

The WTRU may subsequently receive a second connection establishment message from the serving cell containing the configuration information associated with the candidate connectivity node selected by the WTRU. The second connection establishment message may be received after the WTRU provides to the serving cell the information in the first connection establishment response message received from the selected candidate connectivity node. Alternatively, the second connection establishment message may be received after the serving cell directly receives information on the preliminary connection establishment associated with the WTRU from the selected candidate connectivity node.

The configuration information in the second connection establishment message may include configuration of radio bearers, and security algorithm applied at the selected connectivity node, and dedicated RACH resources for performing initial access with the target cell for example. The configuration information may also include conditions for HO (e.g., RSRP, signal-to-interference-plus-noise ratio (SINR) measurement threshold values) which may be used by the WTRU for performing further evaluations in scenarios when the conditions for performing handover reliably to the selected connectivity node may not be satisfied (e.g., the RSRP received from selected connectivity node is below a certain threshold) when receiving the configuration information.

Upon receiving the second connection establishment message from the serving cell, the WTRU may establish RRC connection with the selected connectivity node (e.g., target cell) after synchronization and may send a connection establishment complete message (e.g. RRC Reconfiguration complete) to the selected connectivity node.

WTRU Determines Alternative Connectivity to a Network Node Based on Sensing of Non-RF Signals According to an embodiment, the WTRU performs sensing and/or measurements of non-RF signals, including visual, laser, THz signals (e.g. with quasi-optical properties) and optical signals, using one or more non-RF based sensors such as cameras/visual sensor, lidar sensors, infra-red sensors, laser receivers/sensor, based on sensing configuration received from network. The WTRU may perform sensing/measurements of non-RF signals for selecting a network node, and possibly selecting at least a beam associated with the network node, for establishing connectivity, for example. In this case, the sensing configuration received by the WTRU may be associated with one or more parameters of non-RF signals (e.g. laser, lidar, THz signals, optical and/or infra-red signals) including sequence pattern, code, periodicity, pulse width, angle of departure, for example. The configuration received by WTRU related to the different non-RF signals and the associated parameters may also be associated with different indexes/IDs.

During sensing operation, possibly for determining a network node/beam for establishing connectivity, the WTRU may receive the non-RF signals transmitted from a network node (e.g. TRP, gNB). In an example, the network node may use different non-RF signals when transmitting in different directions/sectors in the 3D space. In another example, the network node may use different non-RF signals which may be transmitted in the same direction when transmitting the RF-based beams.

The WTRU may identify the network node and/or beam, possibly along with the other parameters (e.g. direction of TRP/beam, distance to TRP, angle of departure) based on the reception/measurement of the non-RF signals and comparison with respect to the sensing configuration consisting of the parameters associated with the non-RF signals. In an example, the WTRU may be configured with a sequence pattern corresponding to a non-RF signal transmitted by a TRP where the sequence pattern may be associated with a TRP ID. The WTRU, upon visually detecting a TRP with a camera for example, may also perform sensing/measurement of the non-RF signal received from the visually detected TRP and identify the TRP based on the corresponding sequence pattern. In another example, a configured sequence pattern corresponding to a non-RF signal may indicate the direction of an RF beam and/or beam index/ID from a TRP. The WTRU may identify the beam direction and/or beam index/ID received from the TRP based on the associated/configured sequence pattern of the non-RF signal.

The WTRU may perform different actions including link selection, connectivity establishment, and/or sending XR-RRM reports based on sensing of the non-RF signals from the TRP/gNBs and the sensing configuration received from network. When sending a report/request to the network, the WTRU may indicate the indexes/IDs associated with the sensed/received non-RF signals.

WTRU Determines/Selects Alternative Beams from a Network Node Based on XR Sensing According to an embodiment, the WTRU performs XR sensing, including visual sensing, for selecting Tx beams from a TRP/gNB based on RRM/XR RRM configuration received from network and/or visual image processing for estimating the beam parameters.

The WTRU may receive RRM configuration, which may include configuration information and/or parameters related to SSB/beams such as beam-sweeping order/direction, beam indexes/ID, angle of departure of the beams, associated with the one or more beams transmitted from a TRP/gNB, for example. The WTRU may also receive the XR-RRM configuration, which may include one or more visual objects corresponding to TRPs/gNBs and visual selection criteria for selecting an alternative TRP/gNB. The visual selection criteria may indicate selecting a TRP/gNB, possibly for establishing connectivity, when the cross-correlation value obtained when performing comparison between the visually detected image of a TRP/gNB and the visual object received in the configuration is above a threshold value and remains above a threshold value for a certain duration, for example. The XR-RRM configuration received by WTRU may also include XR-RRM events, which may indicate performing visual sensing for identifying alternative TRPs/gNBs when detecting a blockage that may obstruct the LOS path/link between the serving TRP/gNB and the WTRU, for example.

Upon selecting a target TRP/gNB, based on visual sensing and/or satisfying the visual selection criteria, the WTRU may also determine one or more candidate Tx beams for establishing connectivity from the selected target TRP/gNB. In this case, the WTRU may determine the (3D or 2D) angle of departure of a subset of beams that may be transmitted by the selected TRP/gNB during beam-sweeping, for example. The WTRU may determine the angle of departure of the beams based on the width of viewport orientation of the WTRU and the corresponding one or more beams that may have total beam-width that fall within the width of the viewport orientation, for example. The WTRU may use the RRM configuration for determining the angle of departure of the candidate beams and possibly the beam-sweeping parameters from the target TRP/gNB. Based on the determined angle of departure, the WTRU may identify the subset of candidate beams from the selected TRP/gNB. In the case when a suitable RRM configuration is not available, the WTRU may determine the beam/SSB related parameters from the SIB received from the target TRP/gNB. Alternatively, the WTRU may send a request to the serving or target TRP/gNB indicating the information related to the WTRU viewport (e.g. width of viewport orientation) and in response, receive the associated beam/beam-sweeping parameters (e.g. angle of departure, beam indexes/IDs) that correspond to the indicated WTRU viewport information. The WTRU may also receive assistance information for making measurements and possibly the resources (e.g. RACH preambles, SRS, configured grant) for sending reports or assisting beams/SRS for enabling measurements of UL beams sent by WTRU at the selected target TRP/gNB, for example.

The WTRU may also determine the Rx beams associated with the selected candidate Tx beams. In this case, the Rx beams may correspond to the beams that fall within the width of the WTRU viewport, for example. Next, the WTRU may perform RSRP/RSSI/SSB measurements on the candidate Tx beams received via the determined Rx beams. The WTRU may select one of more of the Tx beams from the candidate beams that may have measurements above a threshold value, for example. The WTRU may identify the indexes/IDs of the selected Tx beams from the RRM configuration or the SSB information received when making measurements on the beams.

The WTRU may send the measurement report, indicating the selected/determined beams (i.e. beam indexes/IDs), to the serving TRP/gNB and/or directly to the selected target TRP/gNB. The measurement report sent by the WTRU may also include the request for establishing connectivity with the selected target TRP/gNB using the selected Tx beam(s), for example. In another example, the WTRU may send the report to serving and/or target TRP/gNB indicating the selected beams implicitly using RACH preambles/resources in UL, RF-based beams/SRS in UL, or non-RF signals (e.g. infra-red, laser, lidar, free-space optical) associated with the selected Tx beams. In this case, the WTRU may determine the associated UL signals for sending the report on selected Tx beams implicitly based on the RRM/SSB configuration received by WTRU indicating the mapping between the Tx beams and the RACH, UL RF signals and/or UL non-RF signals, for example.

Figure 2:
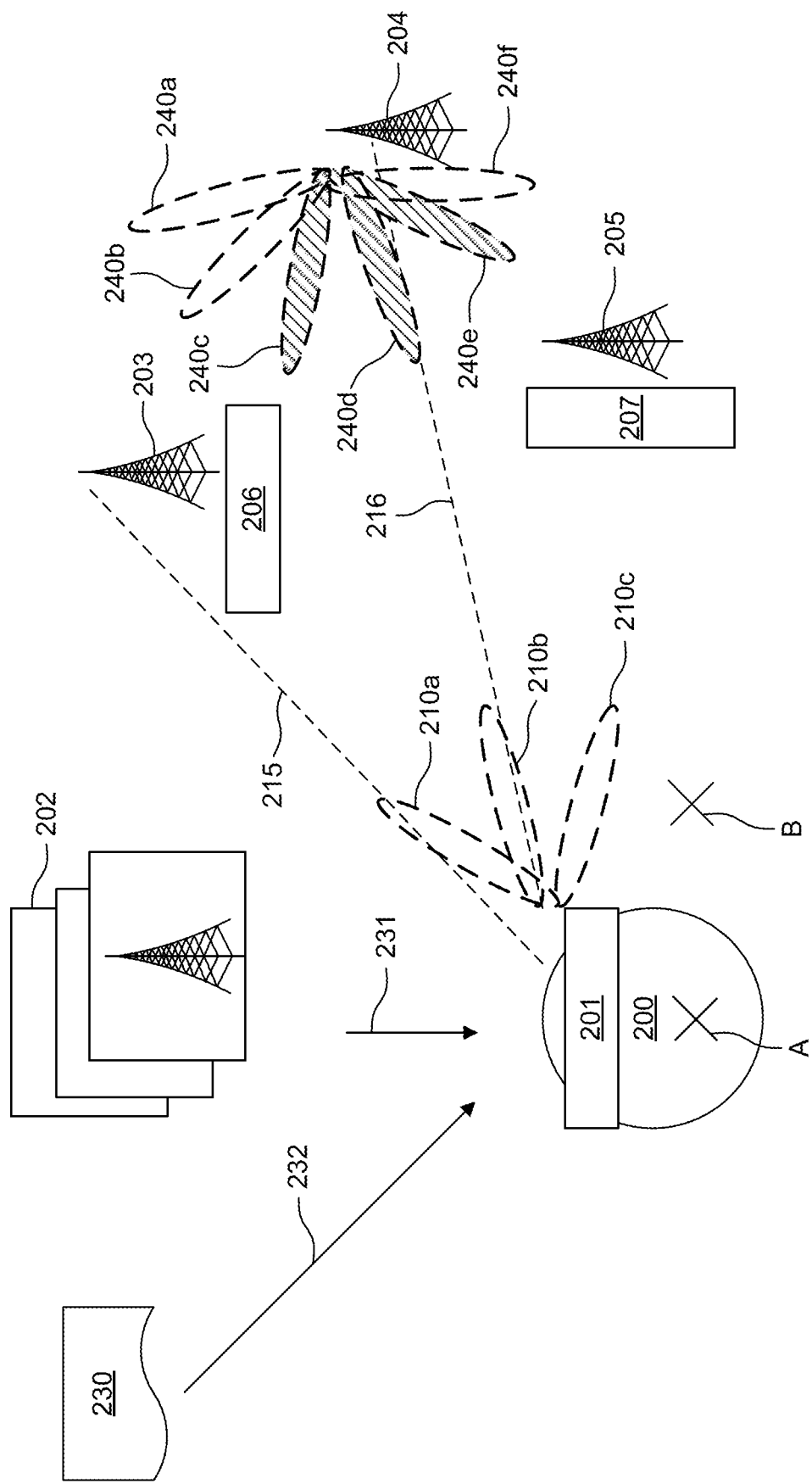
FIG. 2 is a WTRU determining/selecting potential beams from a target Transmission-Reception Point (TRP) based on XR sensing (e.g., visual sensing and RF measurements)

FIG. 2 illustrates how a WTRU performs visual sensing of visual objects for detecting a target TRP when triggered by an XR-RRM event, e.g., a barrier detection.

The figure shows: a user 200, in a position A; a WTRU (e.g., here: a HMD) 201; visual objects 202; a source TRP/gNB 203; a target TRP1, 204; a target TRP2, 205; a first barrier 206 in the LOS path 215 between the WTRU 201 and source TRP/gNB 203; a second barrier 207 in the LOS path 216 between the WTRU 201 and the target TRP 205; WTRU Rx beams 210*a-c*; target TRP1, 204, Tx beams 240*a-f*, with hatched beams 240*c-e* representing potential candidate TRP Tx beams within the viewport and/or LOS of the WTRU (201); XR-RRM configuration (e.g., comprising XR-RRM events) 230; and arrow 231 indicating that visual objects 202 are visible to WTRU 201. In this example, since the WTRU Rx beam 210*b* is best aligned with the TRP Tx beam 240*d*, the Tx beam 240*d*, and possibly in association with the paired Rx beam 210*b*, may be selected when the WTRU 201 establishes connectivity with the target TRP1 204.

Figure 3:
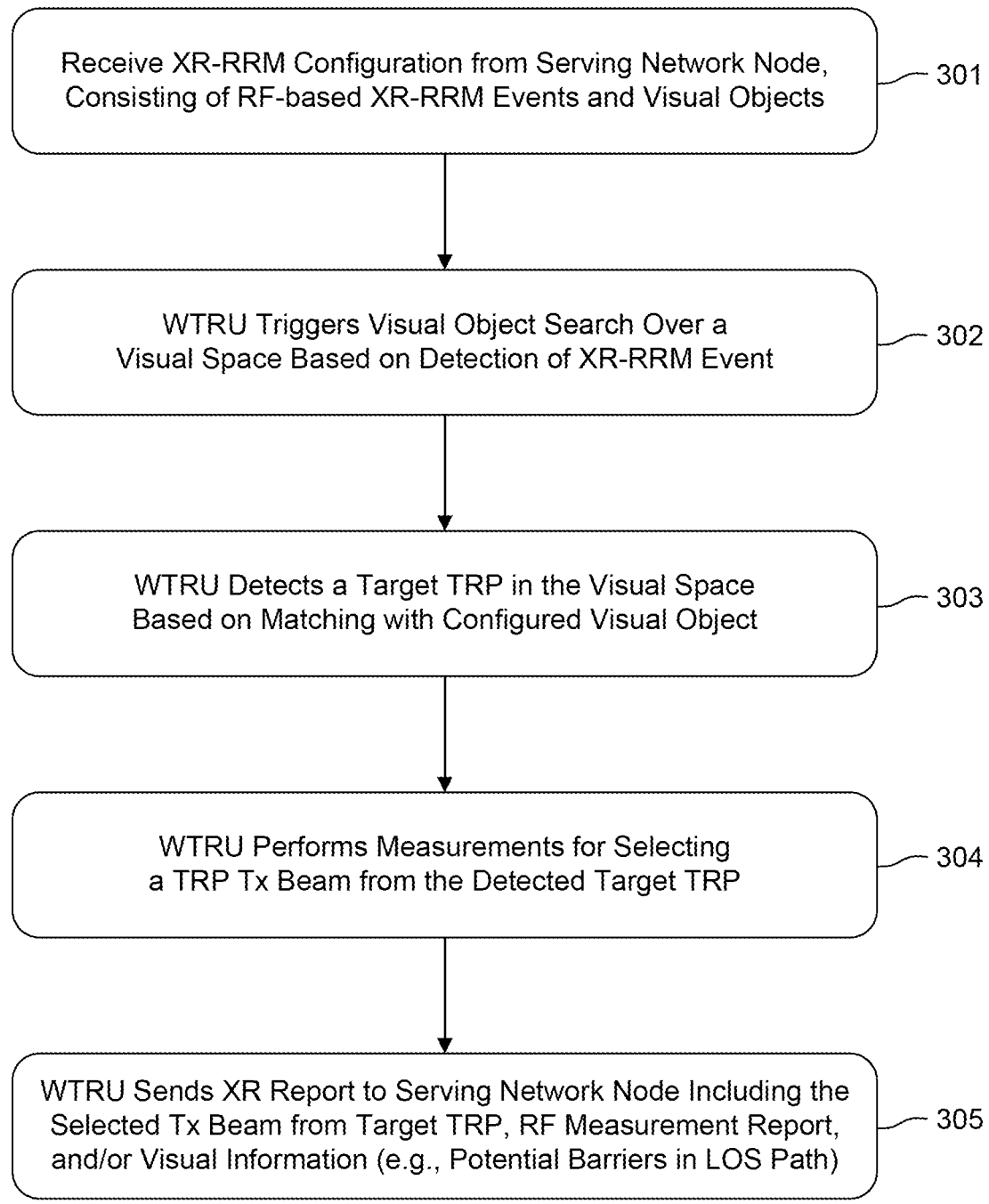
FIG. 3 is a flow chart of an exemplary embodiment of a method for a WTRU for determining/selecting potential beams from a target TRP based on XR sensing.

FIG. 3 is a flow chart of a method of a WTRU (e.g., 201) performing visual sensing of visual objects for detecting a target TRP when triggered by an XR-RRM event, e.g., a barrier detection.

In 301, the WTRU (e.g., 201) receives XR-RRM configuration (230) from a serving network node (e.g., gNB 203), consisting of configured RF-based XR-RRM events and configured visual objects (e.g., 202, 231). In an example, the WTRU 201 at an initial position A may be connected to the serving TRP/gNB 203 via a Tx beam 215. As the WTRU 201 moves from position A to a new position B, one of the configured RF-based XR-RRM events may be triggered, due to the presence of a barrier/blockage 206. In this case, the RF-based XR-RRM event may correspond to the Tx beam 215, between the serving TRP/gNB 203 and the WTRU 201, to be no longer in the LOS path due to the obstruction caused by the barrier/blockage 206, for example. In 302, the WTRU (e.g., 201) triggers a visual object search over a visual space (e.g., defined by the viewport of WTRU 204) based on detection of one of the configured RF-based XR-RRM events (e.g., when WTRU 201 moves from position A to position B, an RF-based XR-RRM event is detected on Tx beam 215 as the beam becomes (partly, fully) obstructed by barrier 206). In 303, the WTRU (e.g., 201) detects a target TRP (e.g., TRP1, 204) in the visual space based on matching with one of the configured visual objects (e.g., 202, 231). In 304, the WTRU (e.g., 201) performs measurements for selecting one of the TRP Tx beams (e.g., 240*a-f*) of the detected target TRP (e.g., 204). In 305, the WTRU (e.g., 201) sends an XR report to the network including: an identifier of the selected target TRP (e.g., TRP1, 204), an identifier of the selected Tx beam of the selected target TRP (e.g., one of 240*c-e* in LOS of WTRU 204, e.g., 240*d*) from the target TRP (e.g., 204); an RF measurement report relating to the RF measurements on which the target TRP/Tx beam combination is based; and/or visual information (e.g., potential barriers 206, 207) in the LOS path (e.g., 216) with the target TRP (e.g., TRP1, 204).

Methods for Supporting XR Assisted RRM Measurement and Reporting

WTRU Performs Visual Sensing to Detect Visual Objects Based on Triggering of XR-RRM Events According to an embodiment related to performing XR-RRM measurement and reporting, a WTRU may receive XR-RRM configuration from the network, where the XR-RRM configuration may include one or more XR-RRM measurement objects and XR-RRM measurement events. For example, the XR-RRM configuration related to visual sensing may include visual objects (e.g. network node, antenna array) and visual events (e.g. detection of visual objects in WTRU viewport).

Upon configuration, the WTRU may monitor for the triggering of the configured XR-RRM events based on sensing. For example, a WTRU configured with visual objects and visual events may perform visual search and filtering operations for detecting the presence of the configured visual objects in the WTRU viewport.

In this case, a WTRU may determine a second visual object via visual sensing where the second visual object corresponds to one or more visual objects/images from the surrounding environment. The WTRU may then apply a visual detection criterion for detecting the first visual object within the second visual object. For example, the visual detection criteria, which may be configured in the WTRU and used for successfully detecting visual objects, may indicate satisfying the following conditions:
 i) The measurement value obtained for the first visual object after overlaying the first visual object on the second visual object and performing convolution and cross-correlation operation is greater than or equal to threshold value; and
 ii) The measurement value obtained remains greater than or equal to the threshold value for a certain time duration.

Based on the triggering of the XR-RRM events, the WTRU may send XR-RRM report to the network containing the information on the detection of the configured visual objects (e.g., identifiers/indexes of the visual objects).

WTRU Performs RF-Based RRM Measurements Based on Triggering of XR-RRM Events

According to an embodiment related to RF-based RRM measurement and reporting, the WTRU may receive a configuration related to RF-based RRM measurement objects/events and another configuration related to XR-RRM measurement objects/events (e.g. visual objects) along with the conditions for triggering the RF-based measurements based on XR-RRM events. The WTRU may receive the RF-based RRM configuration and/or the triggering conditions from the RRC entity in network while the XR-RRM configuration may be received from a different RRC entity or an RRM entity in network, for example.

In one example of the embodiment related to RF-based RRM measurement and reporting, the WTRU configured with a first RRM configuration (i.e., visual XR-RRM measurements/events) and a second RRM configuration (e.g. RF-based RRM measurements/events), may initiate the second RRM configuration upon the triggering of an event in the first RRM configuration (e.g. detection of a visual object). This example may apply in a scenario where the WTRU may trigger the RF measurements (e.g. CSI-RS, SSB) of one or more LOS links upon the detection of a visual object (e.g. antenna array).

In another example of the embodiment related to RF-based RRM measurement and reporting, the WTRU may be configured to initiate a first RRM configuration (visual XR-RRM) and a second RRM configuration (RF measurements/events) and the parameters associated with the second RRM configuration may be changed upon triggering of an event in the first RRM configuration. This example may apply in a scenario where the WTRU may initially perform RF based measurements on an NLOS link using a higher RF measurement periodicity while also performing visual sensing to detect the transmitting network node. The WTRU may then change the RF measurement periodicity to a lower value when visually detecting the transmitting network node. In this case, upon triggering of the visual XR-RRM event (e.g., detection of the transmitting network node), the WTRU may send an indication to the network indicating the detection of the visual object, for example. In response, the WTRU may receive the updated parameters (e.g., measurement periodicity, UL beamforming parameters) associated with the RF measurement configuration. Alternatively, upon the detection of the visual object and determining its associated positioning information, the WTRU may use different measurement parameters, possibly pre-configured in WTRU, for performing the RF-based measurements.

The WTRU may then send to the network the RF measurement information (e.g. RSRP) and possibly, the information related to the detected visual XR-RRM objects (e.g. identifiers of visual objects), in the RRM report.

Methods for Supporting XR Assisted Connectivity Selection
WTRU Assist with the Selection of Alternative Connectivity Nodes for Future Connectivity Establishment/Handover Based on Visual Sensing According to an embodiment related to the selection of an alternative connectivity node, the WTRU may initially receive XR-RRM configuration to perform visual/positioning sensing based on triggering of XR-RRM events. The XR-RRM events configured in WTRU may be related to determining potential propagation loss or LOS link blockage between the WTRU and serving gNB based on visual sensing, for example. In this case, the XR-RRM event may be triggered when visually detecting a moving visual object (e.g. barrier, vehicle), when the visual object is located within certain distance to the LOS path between the WTRU and the serving gNB, for example.

Based on the triggering of the XR-RRM event, the WTRU may perform visual sensing to determine visual objects (e.g. images of network nodes, relay nodes, antenna arrays) associated with alternative connectivity nodes for performing future connectivity establishment or handover. The WTRU may also determine the feasibility of establishing connectivity with the alternative connectivity nodes by performing RF-based sensing which may include passive sensing (e.g. measuring reference signals, cell identifier) and/or active sensing (e.g. transmission of probing/discovery message and reception of connectivity response), for example. The WTRU may send an indication to the serving gNB, consisting of the information on the alternative connectivity nodes determined via visual sensing (i.e. images/visual objects of network nodes) and possibly, information determined via RF-based sensing (e.g. measurements made on CSI-RS, SSB).

The WTRU may receive configuration information from the serving gNB for establishing connectivity to one or more selected connectivity nodes. The received configuration information may also contain connectivity establishment conditions for the WTRU to evaluate prior to establishing connectivity. In this case, the connectivity establishment conditions may include RF-based measurement criterion (e.g. RSRP above a threshold value) and/or visual detection criterion (e.g. visual image cross-correlation value greater than a threshold). For example, when applying the conditional handover procedure, the WTRU may receive the conditions associated with one or more candidate target cells, where the conditions may indicate satisfying a visual detection criterion, and possibly a RF-based measurement criterion for selecting and establishing connectivity with a target cell.

The WTRU may then send a connectivity establishment message (i.e. RRC) to a selected connectivity node based on the configuration information and/or satisfying the connectivity establishment conditions (i.e. visual and/or RF) received from the serving gNB.

Figure 4:
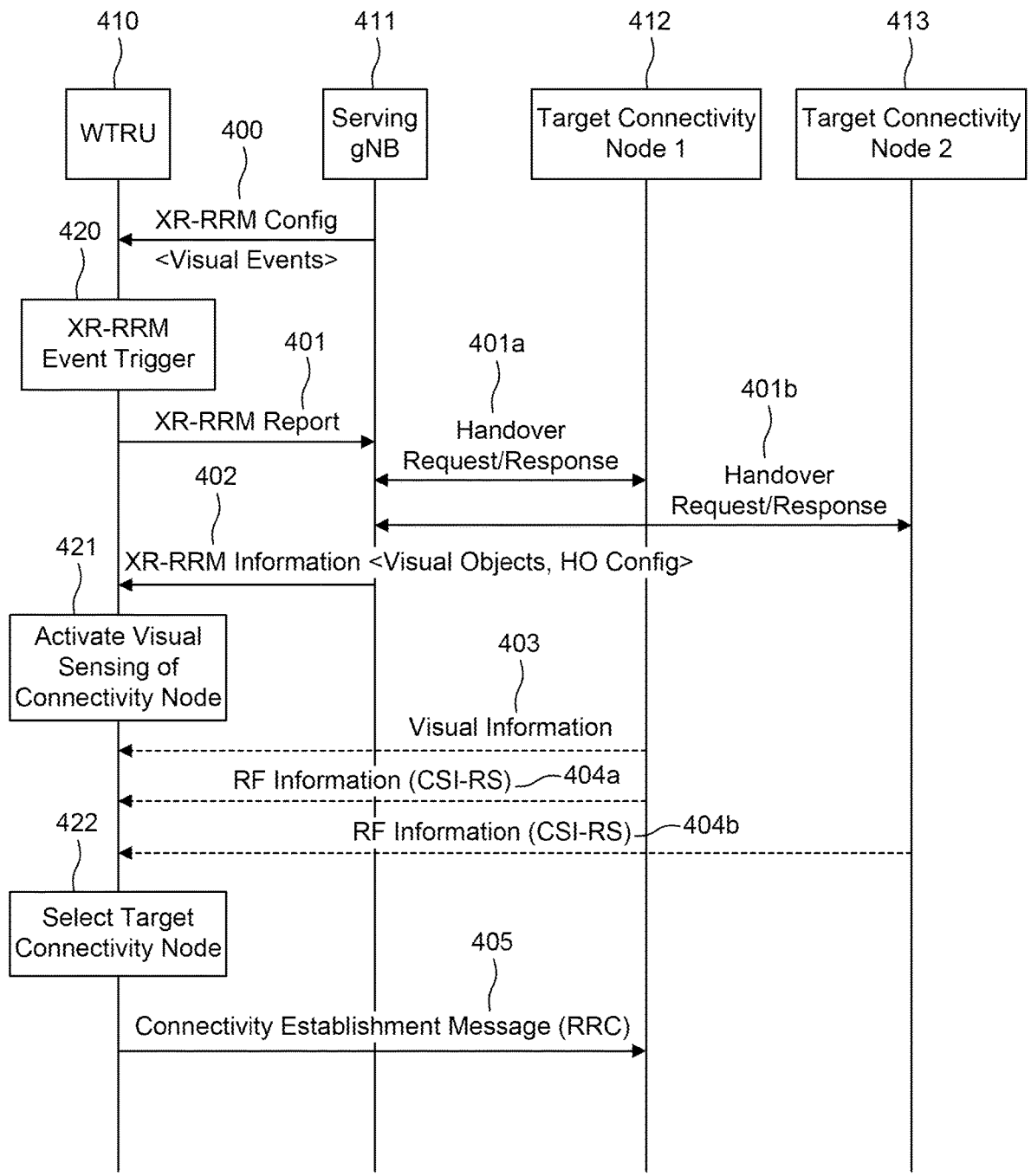
FIG. 4 is an example procedure for selecting a target connectivity node based on visual sensing.

WTRU Selects Alternative Connectivity Nodes for Future Connectivity Establishment/Handover Based on Visual Sensing A procedure, according to an embodiment, for selecting a connectivity node based on visual sensing is illustrated in FIG. 4. In the procedure shown in this figure, WTRU 410 selects target connectivity node 1 (412) for establishing connectivity based on the configuration information (400) provided by serving gNB (411) in XR-RRM information and visual detection of target connectivity node 1 (412) using visual comparison measurement and visual detection criterion.

While referring to FIG. 4, according to an embodiment related to the selection an alternative connectivity node, a WTRU (410) receives a configuration (400) XR-RRM measurement objects/events from the serving gNB (411). The WTRU (410) may send an indication in XR-RRM report (401) to the network when triggered by an XR-RRM event (420) (e.g., potential LOS link blockage). Receipt of the XR-RRM report (401) by the serving gNB (411) triggers an exchange of handover request/response (401a, 401b) between the serving gNB (411) and target connectivity node 1 (412) and/or target connectivity node 2 (413). In response, the WTRU (410) may receive, from the serving gNB (411), XR-RRM information (402) containing a first visual object (e.g., an image frame or a 3D object) of one or more alternative connectivity nodes. The WTRU (410) may perform local processing to derive a modified first visual object by applying corrections related to size and orientation based on latest WTRU positioning. Activation (421) of visual sensing of the connectivity node may then be triggered in the WTRU (410) by receipt by the WTRU (410) of XR-RRM information (402).

The WTRU (410) may then detect or receive, from the target connectivity node 1 (412), visual information (403) consisting of a second visual object, where the second visual object is visually accessible or visually detectable from the WTRU (410) and may consist of one or more visual objects/images from the surrounding environment of WTRU (410), including one or more alternative connectivity nodes. The second visual object may also consist of image frames with a frame size which may be larger than the frame size of the first visual object, for example. The WTRU (410) may also receive RF information (404a, 404b) consisting of reference signals transmitted by one or more alternative connectivity nodes, e.g., from target connectivity node 1 (412) and/or from target connectivity node 2 (413).

The WTRU (410) may select an alternative connectivity node associated with the first visual object based on a visual comparison measurement and a visual detection criterion configured in the WTRU (410). The visual comparison measurement may be determined as a function of image cross-correlation between the first visual object and a second visual object, for example. The visual detection criterion may indicate selecting an alternative connectivity node, associated with the first visual object, if the visual comparison measurement obtained is greater than or equal to a threshold value and the measurement remains above the threshold value for a certain time duration. The WTRU (410) may also determine the accessibility of the selected connectivity node based on the RF measurements (e.g. RSRP of CSI-RS, DL beam) associated with the connectivity node, prior to selecting the connectivity node.

The WTRU (410) may also determine the positioning information (e.g. direction, distance, angle of arrival) of the selected connectivity node associated with the first visual object, with respect to the WTRU (410). In this case the positioning information of the selected connectivity node may be determined by identifying the positioning attributes (e.g., orientation) of the region in the image frame associated with the second visual object that satisfies the visual detection criterion, for example. In one example of the embodiment related to the selection of a beam associated with an alternative connectivity node, a WTRU may determine the UL beam parameters based on the positioning information to align with the DL beam transmitted from the selected connectivity node associated with the first visual object.

Upon selecting (422) the connectivity node, the WTRU (410) may send (405) connectivity establishment message (i.e., RRC) to the selected connectivity node, when the configuration information associated with the selected connectivity node is available at WTRU (410). Alternatively, the WTRU (410) may send an indication to the serving gNB (411), indicating the information on the selected connectivity node (e.g. visual object identifier, cell identifier, DL beam identifier). The WTRU (410) may then send (405) connectivity establishment message (i.e. RRC) to a selected connectivity node based on the configuration information received from the serving gNB (411).

Figure 5:
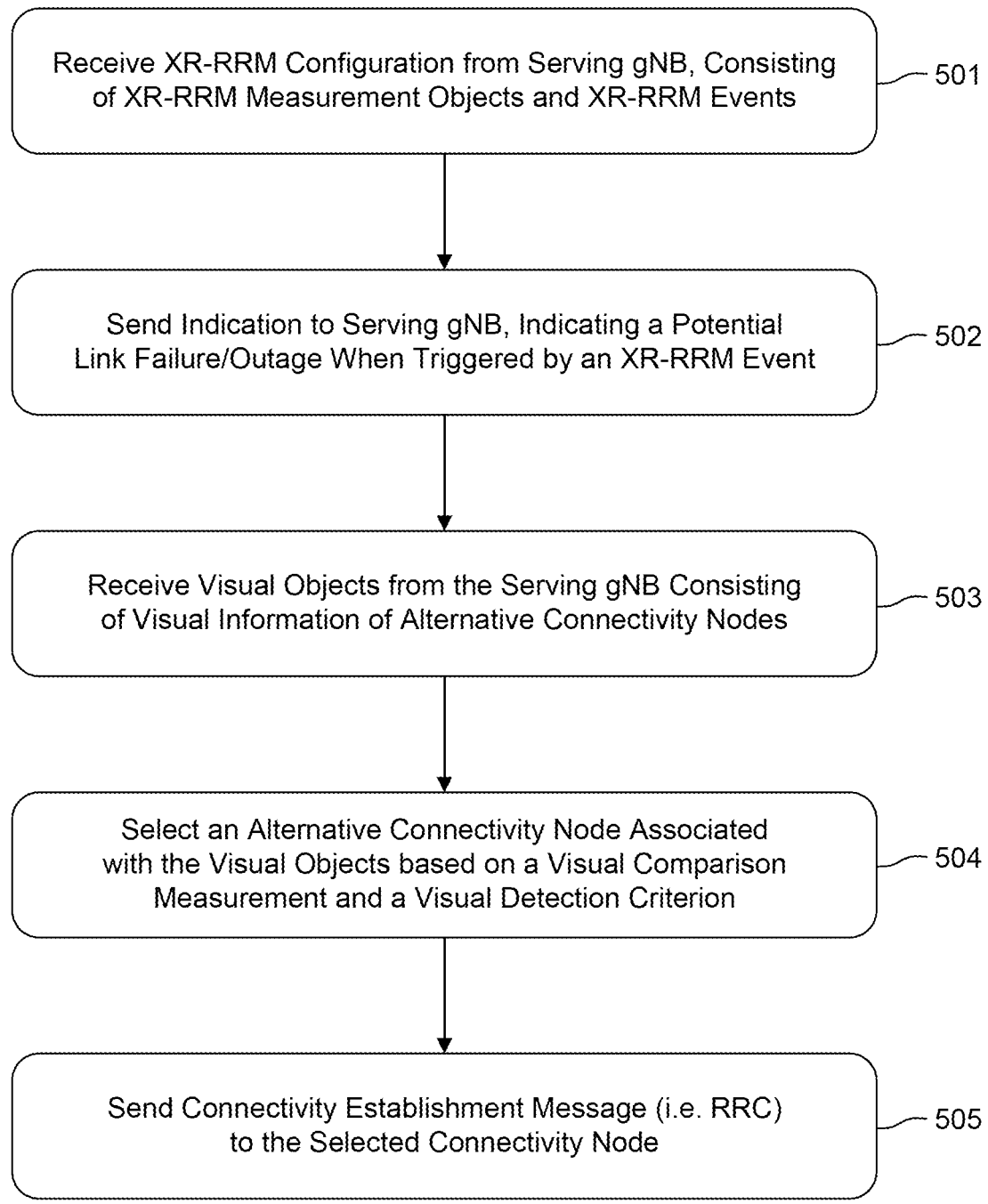
FIG. 5 is a flow chart of an exemplary embodiment.

FIG. 5 is a flow chart of an exemplary embodiment. A WTRU (e.g. an XR-WTRU with visual sensing capability) may determine one or more alternative connectivity nodes (e.g., target gNB, TRP, relay node; network node) as candidates for performing future connectivity establishment/handover based on visual information consisting of at least one of:
 visual objects of alternative connectivity nodes;
 visual objects determined from the surrounding environment of a WTRU.
A WTRU may be configured (501) to perform the following:
 Send (502) indication to serving gNB, indicating a potential link failure/outage when triggered by an XR-RRM event:
  XR-RRM event, configured in the WTRU, may be related to detection of an obstruction/barrier that may result in potential propagation loss or LOS link blockage between the WTRU and serving gNB; The WTRU may include visual objects from surrounding environment and/or
  WTRU positioning information (e.g. location of WTRU) in the indication sent to the serving gNB.
 Receive (503) a first visual object from the serving gNB consisting of visual information (e.g. image frame or 3D object) of one or more alternative connectivity nodes which can be accessed by WTRU (e.g., visible to WTRU);
 Select (504) an alternative connectivity node associated with the first visual object based on a visual comparison measurement and a visual detection criterion:
  Visual comparison measurement may be determined as a function of image cross-correlation between the first visual object and a second visual object, where the second visual object corresponds to the image determined by WTRU from the surrounding environment;
  Visual detection criterion may indicate selecting an alternative connectivity node, associated with the first visual object, if the visual comparison measurement obtained is greater than or equal to a threshold value and the measurement remains above the threshold value for a certain time duration;
  The WTRU may determine the accessibility of the selected connectivity node by performing RF measurements (e.g., RSRP of CSI-RS, DL beam) associated with the connectivity node.
 Send (505) connectivity establishment message (i.e., RRC) to the selected connectivity node:
  WTRU may establish connectivity with the selected connectivity node after sending the information related to the connectivity node (e.g. node identifier, RF measurements) and receiving the associated configuration information from serving gNB.

Figure 6:
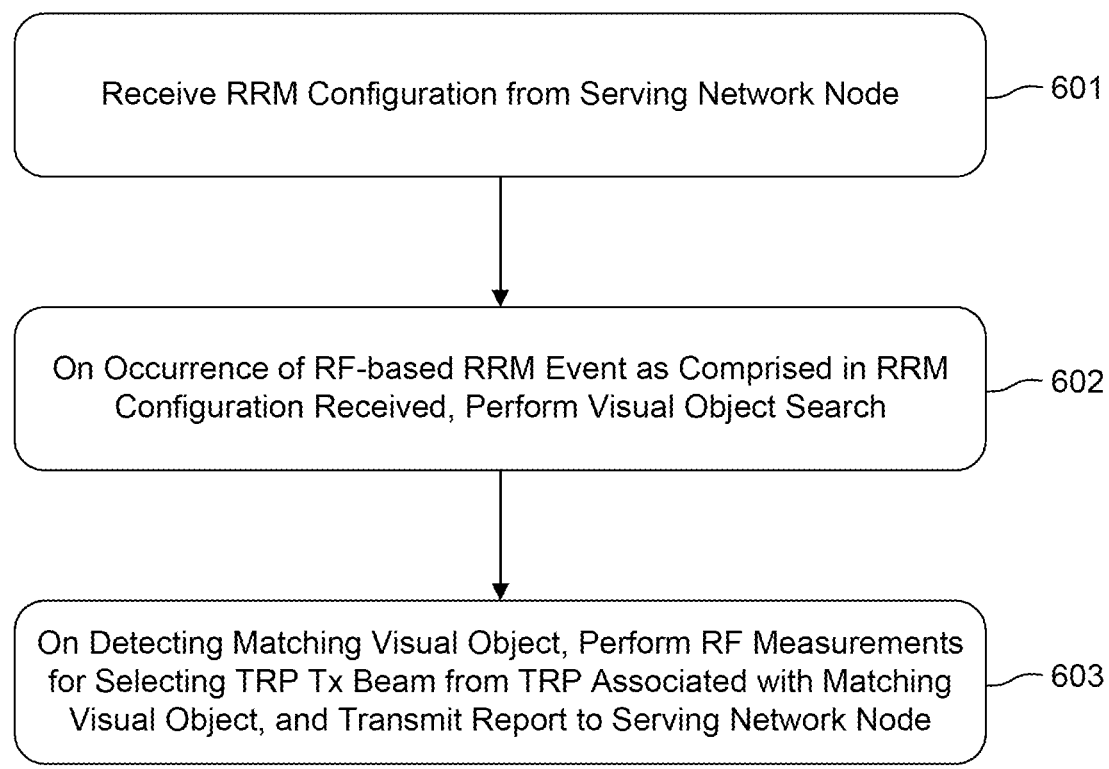
FIG. 6 is a flow chart of a method implemented by a WTRU according to an embodiment.

FIG. 6 is a flow chart of a method implemented by a WTRU according to an embodiment.

In 601, the WTRU receives Radio Resource Management, RRM, configuration information from a serving network node, the RRM configuration information comprising Radio Frequency-based RRM events related to potential Radio-Frequency communication loss between the WTRU and the serving network node, and information about visual objects detectable by the WTRU, the visual objects being associated with target Transmitter-Receiver Points, TRPs, to be searched for in a visual object search performed by the WTRU on occurrence of a related RF-based RRM event;

In 602, under condition of occurrence of a RF-based RRM event as comprised in the RRM configuration information received, performing, by the WTRU, a visual object search; and In 603, under condition of detecting, in the visual object search, a visual object matching one of the visual objects detectable by the WTRU as comprised in the RRM configuration information received, performing RF measurements for selecting a TRP Transmit, Tx, beam from the TRP associated with the matching visual object, and transmitting a report to the serving network node, the report comprising an identifier of the TRP associated with the matching visual object, an identifier of the selected Tx beam of the TRP associated with the matching visual object, the RF measurements, and visual information related to potential barriers in the Line-of-sight, LOS, path between the WTRU and the TRP associated with the matching visual object.

According to an embodiment of the method 601-603, the RF-based RRM event as comprised in the configuration information received is related to obstruction by an object between a LOS path between the WTRU and the serving network node.

According to an embodiment of the method 601-603, the method further comprises a (preliminary) connection request to the TRP associated with the matching visual object, and forwarding a response message of the TRP associated with the matching visual object to the serving network node, for assisting the WTRU with handover of the WTRU from the serving network node to the TRP associated with the matching visual object.

According to an embodiment of the method 601-603, the visual object search is based on at least one of the following:
  detection of visual correspondence, by the WTRU, between the one of the visual objects detectable by the WTRU as comprised in the RRM configuration information received, and a visual object detected by the WTRU;
  detection, by the WTRU, of a TRP associated with one of the visual objects detectable by the WTRU as comprised in the RRM configuration information received.

According to an embodiment of the method 601-603, the RF-based RRM events comprised in the RRM configuration information received are further related to reaching a geographic location by the WTRU, and the WTRU, when reaching the geographic location, transmitting a measurement related to a measurement object comprised in the RRM configuration information received and associated with the RF-based RRM event related to reaching the geographic location, to the serving network node.

According to an embodiment of the method 601-603, the measurement object is at least one of:
  a direction of a viewport of the WTRU when the geographic location is reached;
  a speed of the WTRU when the geographic location is reached;
  relative positioning information of visual objects located with regard to position and direction of the viewport of the WTRU when the geographical location is reached.

According to an embodiment of the method 601-603, the relative positioning information is determined by the WTRU based on Degree of Freedom, DoF, sensors of the WTRU.

According to an embodiment of the method 601-603, the RRM configuration information further comprises a measurement object related to estimation by the WTRU of a remaining time prior to the potential RF communication loss between the WTRU and the serving network node, the WTRU performing the estimation and transmitting the estimation to the serving network node.

According to an embodiment of the method 601-603, the RF-based RRM event as comprised in the RRM configuration received is further related to perceived Quality of Experience, QoE, performance, the WTRU, when triggered by the perceived Quality of Experience performance exceeding an upper threshold value or dropping below a lower threshold value as comprised in the RRM configuration information received, transmitting a measurement to the serving network node of the perceived QoE performance.

There is also disclosed a WTRU according to an embodiment, comprising a receiver and a transmitter, the WTRU being configured to:
  receive Radio Resource Management, RRM, configuration information from a serving network node, the RRM configuration information comprising Radio Frequency-based RRM events related to potential Radio-Frequency communication loss between the WTRU and the serving network node, and information about visual objects detectable by the WTRU, the visual objects being associated with target Transmitter-Receiver Points, TRPs, to be searched for in a visual object search performed by the WTRU on occurrence of a related RF-based RRM event;
  under condition of occurrence of a RF-based RRM event as comprised in the RRM configuration information received, to perform a visual object search; and
  under condition of detecting, in the visual object search, a visual object matching one of the visual objects detectable by the WTRU as comprised in the RRM configuration information received, to perform RF measurements for selecting a TRP Transmit, Tx, beam from the TRP associated with the matching visual object, and to transmit a report to the serving network node, the report comprising an identifier of the TRP associated with the matching visual object, an identifier of the selected Tx beam of the TRP associated with the matching visual object, the RF measurements, and visual information related to potential barriers in the Line-of-sight, LOS, path between the WTRU and the TRP associated with the matching visual object.

According to a further embodiment of the WTRU, the RF-based RRM event as comprised in the configuration information received is related to obstruction by an object between a LOS path between the WTRU and the serving network node.

According to a further embodiment, the WTRU is further configured to transmit a preliminary connection request to the TRP associated with the matching visual object, and to forward a response message of the TRP associated with the matching visual object to the serving network node, for assisting the WTRU with handover of the WTRU from the serving network node to the TRP associated with the matching visual object.

According to a further embodiment, the WTRU is further configured to base the visual object search on at least one of the following:
  detection of visual correspondence between the one of the visual objects detectable by the WTRU as comprised in the RRM configuration information received, and a visual object detected by the WTRU;
  detection of a TRP associated with one of the visual objects detectable by the WTRU as comprised in the RRM configuration information received.

According to a further embodiment of the WTRU, the RF-based RRM events comprised in the RRM configuration information received are further related to reaching a geographic location by the WTRU, and the WTRU, when reaching the geographic location, being further configured to transmit a measurement related to a measurement object comprised in the RF-based RRM configuration information received and associated with the RF-based RRM event related to reaching the geographic location, to the serving network node.

According to a further embodiment of the WTRU, the measurement is at least one of:
  a direction of a viewport of the WTRU when the geographic location is reached;
  a speed of the WTRU when the geographic location is reached;
  relative positioning information of visual objects located with regard to position and direction of the viewport of the WTRU when the geographical location is reached.

According to a further embodiment, the WTRU is further configured to determine the relative positioning information based on Degree of Freedom, DoF, sensors of the WTRU.

According to a further embodiment of the WTRU, the RRM configuration information further comprises a measurement object related to estimation by the WTRU of a remaining time prior to the potential RF communication loss between the WTRU and the serving network node, the WTRU being further configured to perform the estimation and to transmit the estimation to the serving network node.

According to a further embodiment of the WTRU, the RF-based RRM event as comprised in the RRM configuration information received is further related to perceived Quality of Experience, QoE, performance, the WTRU being further configured to, when triggered by the perceived Quality of Experience performance exceeding an upper threshold value or dropping below a lower threshold value as comprised in the RRM configuration information received, transmit a measurement to the serving network node of the perceived QoE performance.

Figure 7:
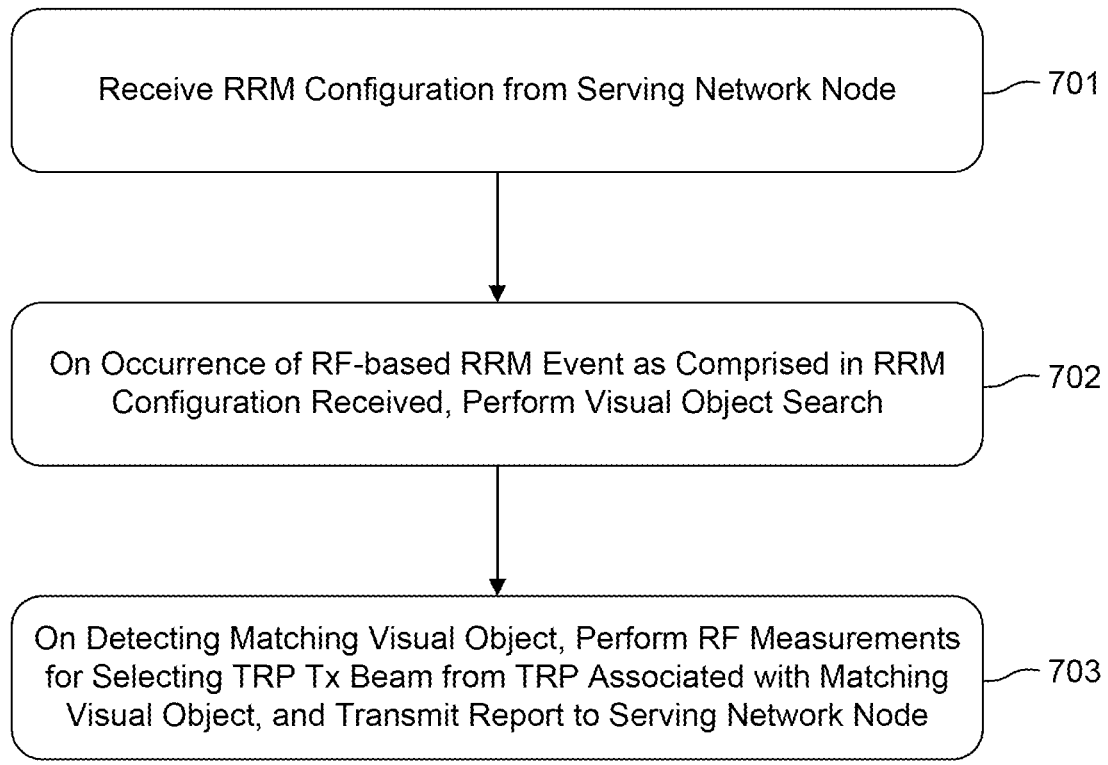
FIG. 7 is a flow chart of a method implemented by a WTRU according to a further embodiment.

FIG. 7 is a flow chart of a method implemented by a WTRU according to an embodiment.

In 701, the WTRU receives Radio Resource Management, RRM, configuration information from a serving network node, the RRM configuration information comprising information indicating Radio Frequency-based RRM events related to expected Radio-Frequency communication loss between the WTRU and the serving network node, and visual information about visual objects detectable by the WTRU, the visual objects associated with Transmitter-Receiver Points, TRPs.

In 702, under condition of occurrence of a RF-based RRM event as comprised in the RRM configuration information received, the WTRU performs a visual object search.

In 703, under condition of detecting, in the visual object search, a visual object matching one of the visual objects detectable by the WTRU as comprised in the RRM configuration information received, the WTRU performs RF measurements, selects a TRP Transmit, Tx, beam from the TRP associated with the matching visual object based on at least the RF measurements, and transmits a report to the serving network node, the report comprising information related to the RF measurements performed and visual information obtained by the WTRU, related to the visual object search.

According to an embodiment of the method, the information related to the RF measurements performed, comprises an identifier of the TRP associated with the matching visual object, an identifier of the selected Tx beam of the TRP associated with the matching visual object, and wherein the visual information is related to expected barriers in the Line-of-sight, LOS, path between the WTRU and the TRP associated with the matching visual object.

According to an embodiment of the method, the RF-based RRM event as comprised in the configuration information received is related to obstruction by an object between a LOS path between the WTRU and the serving network node.

According to an embodiment of the method, the visual information obtained by the WTRU related to the visual object search is any of:
at least one image frame of a video stream captured by an image sensor of the WTRU;
at least one index of at least one visual object configured in the WTRU and detectable by via the image sensor;
at least one identifier of at least one visual object configured in the WTRU and detectable by via the image sensor;
at least one index of at least one spatial anchor configured in the WTRU and detectable via the image sensor;
at least one identifier of at least one spatial anchor configured in the WTRU and detectable via the image sensor.

According to an embodiment of the method, the method further comprises sending a connection request to the TRP associated with the matching visual object, and forwarding a response message of the TRP associated with the matching visual object to the serving network node.

According to an embodiment of the method, the visual object search is based on at least one of the following:
detection of visual correspondence, by the WTRU, between the one of the visual objects detectable by the WTRU as comprised in the RRM configuration information received, and a visual object detected by the WTRU;
detection, by the WTRU, of a TRP associated with one of the visual objects detectable by the WTRU as comprised in the RRM configuration information received.

According to an embodiment of the method, the RF-based RRM events comprised in the RRM configuration information received are further related to entering a geographic location by the WTRU, and the WTRU, when entering the geographic location, transmitting a measurement related to a measurement object comprised in the RRM configuration information received and associated with the RF-based RRM event related to entering the geographic location, to the serving network node.

According to an embodiment of the method, the measurement object is at least one of:
a direction of a viewport of the WTRU when the geographic location is entered;
a speed of the WTRU when the geographic location is entered;
relative positioning information of visual objects located with regard to position and direction of the viewport of the WTRU when the geographical location is entered.

According to an embodiment of the method, the relative positioning information is determined by the WTRU based on Degree of Freedom, DoF, sensors of the WTRU.

According to an embodiment of the method, the RRM configuration information further comprises a measurement object related to estimation by the WTRU of a remaining time prior to the expected RF communication loss between the WTRU and the serving network node, the WTRU performing the estimation and transmitting the estimation to the serving network node.

According to an embodiment of the method, the RF-based RRM event as comprised in the RRM configuration received is further related to perceived Quality of Experience, QoE, performance, the WTRU, when triggered by the perceived Quality of Experience performance exceeding an upper threshold value or dropping below a lower threshold value as comprised in the RRM configuration information received, transmitting a measurement to the serving network node of the perceived QoE performance.

The present further relates to a wireless transmit/receive unit, WTRU, comprising a receiver and a transmitter, the WTRU being configured to:
receive Radio Resource Management, RRM, configuration information from a serving network node, the RRM configuration information comprising information indicating Radio Frequency-based RRM events related to expected Radio-Frequency communication loss between the WTRU and the serving network node, and information about visual objects detectable by the WTRU, the visual objects associated with Transmitter-Receiver Points, TRPs;

under condition of occurrence of a RF-based RRM event as comprised in the RRM configuration information received, to perform a visual object search; and under condition of detecting, in the visual object search, a visual object matching one of the visual objects detectable by the WTRU as comprised in the RRM configuration information received, to perform RF measurements, selecting a TRP Transmit, Tx, beam from the TRP associated with the matching visual object based on at least the RF measurements, and to transmit a report to the serving network node, the report comprising information related to the RF measurements performed and visual information obtained by the WTRU, related to the visual object search.

According to an embodiment of the WTRU, the information related to the RF measurements performed, comprise an identifier of the TRP associated with the matching visual object, an identifier of the selected Tx beam of the TRP associated with the matching visual object, and wherein the visual information is related to expected barriers in the Line-of-sight, LOS, path between the WTRU and the TRP associated with the matching visual object.

According to an embodiment of the WTRU, the RF-based RRM event as comprised in the configuration information received is related to obstruction by an object between a LOS path between the WTRU and the serving network node.

According to an embodiment of the WTRU, the visual information obtained by the WTRU related to the visual object search is any of:

at least one image frame of a video stream captured by an image sensor of the WTRU;

at least one index of at least one visual object configured in the WTRU and detectable by via the image sensor;

at least one identifier of at least one visual object configured in the WTRU and detectable by via the image sensor;

at least one index of at least one spatial anchor configured in the WTRU and detectable via the image sensor;

at least one identifier of at least one spatial anchor configured in the WTRU and detectable via the image sensor.

According to an embodiment of the WTRU, the WTRU is further configured to transmit a connection request to the TRP associated with the matching visual object, and to forward a response message of the TRP associated with the matching visual object to the serving network node.

According to an embodiment of the WTRU, the WTRU is further configured to base the visual object search on at least one of the following:

detection of visual correspondence between the one of the visual objects detectable by the WTRU as comprised in the RRM configuration information received, and a visual object detected by the WTRU;

detection of a TRP associated with one of the visual objects detectable by the WTRU as comprised in the RRM configuration information received.

According to an embodiment of the WTRU, the RF-based RRM events comprised in the RRM configuration information received are further related to entering a geographic location by the WTRU, and the WTRU, when entering the geographic location, being further configured to transmit a measurement related to a measurement object comprised in the RF-based RRM configuration information received and associated with the RF-based RRM event related to entering the geographic location, to the serving network node.

According to an embodiment of the WTRU, the measurement is at least one of:

a direction of a viewport of the WTRU when the geographic location is entered;

a speed of the WTRU when the geographic location is entered;

relative positioning information of visual objects located with regard to position and direction of the viewport of the WTRU when the geographical location is entered.

According to an embodiment of the WTRU, the WTRU is further configured to determine the relative positioning information based on Degree of Freedom, DoF, sensors of the WTRU.

According to an embodiment of the WTRU, the RRM configuration information further comprises a measurement object related to estimation by the WTRU of a remaining time prior to the expected RF communication loss between the WTRU and the serving network node, the WTRU being further configured to perform the estimation and to transmit the estimation to the serving network node.

According to an embodiment of the WTRU, the RF-based RRM event as comprised in the RRM configuration information received is further related to perceived Quality of Experience, QoE, performance, the WTRU being further configured to, when triggered by the perceived Quality of Experience performance exceeding an upper threshold value or dropping below a lower threshold value as comprised in the RRM configuration information received, transmit a measurement to the serving network node of the perceived QoE performance.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claims is intended to invoke 35 U.S.C. § 112, 116 or means-plus-function claim format, and any claim without the terms "means for" is not so intended.

What is claimed is:

1. A method implemented by a wireless transmit/receive unit (WTRU), the method comprising:
   receiving Radio Resource Management (RRM) configuration comprising information from a serving network node comprising at least one RRM event related to expected radio-frequency (RF) propagation loss between the WTRU and the serving network node caused by an object obstructing an in line-of-sight (LOS) path between the WTRU and the serving network node, and comprising information related to at least one candidate target network node, and for each of the at least one candidate target network node, information related to detection, by an optical device of the WTRU, of an optically detectable object associated with the at least one candidate target network node;
   detecting RF propagation loss between the WTRU and the serving network node, determining, based on the information from the serving network node, occurrence of an RRM event, and determining, using the optical device of the WTRU and based on the information related to at least one candidate target network node and the information related to detection of an optically detectable object per the at least one candidate target network node, a correspondence between an optically detectable object in LOS of the WTRU and a candidate target network node from the at least one candidate target network node, and performing RF measurements relative to the candidate target network node; and
   transmitting a report to the serving network node, the report comprising at least some of the information related to the candidate target network node, and information related to the RF measurements relative to the candidate target network node.

2. The method of claim 1, wherein the optical device comprises at least one of: a camera; a lidar; and an infra-red sensor.

3. The method of claim 1, wherein the report further comprises any of:
   location information of the object obstructing the LOS path between the WTRU and the serving network node;
   at least one physical attribute of the object obstructing the LOS path between the WTRU and the serving network node; and
   an estimated time related to a blockage of communication between the WTRU and the serving network node by the object obstructing the LOS path between the WTRU and the serving network node.

4. The method of claim 1, wherein the RRM configuration information further comprises a measurement object related to estimation by the WTRU of a remaining time prior to the expected RF propagation loss between the WTRU and the serving network node, the WTRU performing the estimation and including the estimation in the report.

5. The method of claim 1, wherein the correspondence between the optically detectable object in LOS of the WTRU and a candidate network node is determined based on capturing image frames using the optical device of the WTRU and matching information comprised in the captured image frames with the information related to detection of the optically detectable object.

6. The method of claim 1, wherein the information related to the detection of the optically detectable object associated with the candidate target network node is an image of the optically detectable object.

7. The method of claim 1, wherein the RF measurements relative to the candidate target network node comprise at least one of:
   channel feedback information related to accessible beams relative to the candidate target network node; and
   channel state information reference signal related to accessible beams relative to the candidate target network node.

8. A wireless transmit/receive unit (WTRU), comprising:
   at least one processor; and
   a transceiver operably coupled to the at least one processor, the at least one processor and transceiver being configured to:
   receive Radio Resource Management (RRM) configuration comprising information from a serving network node comprising at least one RRM event related to expected radio-frequency (RF) propagation loss between the WTRU and the serving network node caused by an object obstructing an in line-of-sight (LOS) path between the WTRU and the serving network node, and comprising information related to at least one candidate target network node, and for each of the at least one candidate target network node, information related to detection, by an optical device of the WTRU, of an optically detectable object associated with the at least one candidate target network node;
   detect RF propagation loss between the WTRU and the serving network node, determine, based on the information from the serving network node, occurrence of an RRM event, and determine, using the optical device of the WTRU and based on the information related to at least one candidate target network node and the information related to detection of an optically detectable object per the at least one candidate target network node, a correspondence between an optically detectable object in LOS of the WTRU and a candidate target network node from the at least one candidate target network node, and perform (RF) measurements relative to the candidate target network node; and transmit a report to the serving network node, the report comprising at least some of the information related to the candidate target network node, and information related to the RF measurements relative to the candidate target network node.

9. The WTRU of claim 8, wherein the optical device comprises at least one of: a camera; a lidar; and an infra-red sensor.

10. The WTRU of claim 8, wherein the at least one processor is configured to include, in the report, any of:
- location information of the object obstructing the LOS path between the WTRU and the serving network node;
- at least one physical attribute of the object obstructing the LOS path between the WTRU and the serving network node; and
- an estimated time related to a blockage of communication between the WTRU and the serving network node by the object obstructing the LOS path between the WTRU and the serving network node.

11. The WTRU of claim 8, wherein the RRM configuration information further comprises a measurement object related to estimation by the WTRU of a remaining time prior to the expected RF propagation loss between the WTRU and the serving network node, the at least one processor being further configured to perform the estimation and to include the estimation in the report.

12. The WTRU of claim 8, wherein the at least one processor is configured to determine the correspondence between the optically detectable object in LOS of the WTRU based on capturing image frames using the optical camera device of the WTRU and matching information comprised in the captured image frames with the information related to detection of the optically detectable object.

13. The WTRU of claim 8, wherein the information related to the detection of an optically detectable object associated with the candidate target network node is an image of the optically detectable object.

* * * * *